(12) United States Patent
Kim

(10) Patent No.: US 12,512,056 B2
(45) Date of Patent: Dec. 30, 2025

(54) DISPLAY DEVICE AND METHOD OF DRIVING THE SAME, AND ELECTRONIC DEVICE INCLUDING DISPLAY DEVICE FOR CONTROLLING VOLTAGES BASED ON TEMPERATURE OF DISPLAY PANEL

(71) Applicant: SAMSUNG DISPLAY CO., LTD., Yongin-si (KR)

(72) Inventor: Hyo Min Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 4 days.

(21) Appl. No.: 18/749,138

(22) Filed: Jun. 20, 2024

(65) Prior Publication Data
US 2025/0148976 A1  May 8, 2025

(30) Foreign Application Priority Data

Nov. 7, 2023  (KR) .......... 10-2023-0152577

(51) Int. Cl.
*G06V 40/13*  (2022.01)
*G01J 1/42*  (2006.01)
(Continued)

(52) U.S. Cl.
CPC ....... *G09G 3/3233* (2013.01); *G06V 40/1318* (2022.01); *G09G 2300/0819* (2013.01);
(Continued)

(58) Field of Classification Search
CPC ......... G09G 3/3233; G09G 2300/0819; G09G 2300/0852; G09G 2310/08;
(Continued)

(56) References Cited

U.S. PATENT DOCUMENTS 11,790,687 B2 * 10/2023 Han .................. H10K 59/40
345/212
2011/0115767 A1  5/2011 Senda et al.
(Continued)

FOREIGN PATENT DOCUMENTS

KR  10-0573134  4/2006

OTHER PUBLICATIONS

Guo Chen et al., "Temperature-dependent device performance of organic photovoltaic cells based on a squaraine dye", Synthetic Metals 222, 293-298, Nov. 15, 2016.

*Primary Examiner* — Kwang-Su Yang
(74) *Attorney, Agent, or Firm* — F. CHAU & ASSOCIATES, LLC

(57) ABSTRACT

A display device includes: a display panel including pixels each having a light emitting element located between a first power source receiving a first power voltage and a second power line receiving a second power voltage, and photo sensors including a light receiving element located between a third power line receiving a reset voltage and the second power line; at least one temperature sensor for sensing a temperature of the display panel; a power supply for supplying the first power voltage, the second power voltage, and the reset voltage; and a controller connected to the temperature sensor and the power supply. The controller controls the power supply such that a voltage value of the reset voltage is changed based on the temperature of the display panel.

20 Claims, 11 Drawing Sheets

(51) Int. Cl.
*G09G 3/3233* (2016.01)
*G09G 5/00* (2006.01)

(52) U.S. Cl.
CPC . *G09G 2300/0852* (2013.01); *G09G 2310/08* (2013.01); *G09G 2330/021* (2013.01); *G09G 2354/00* (2013.01); *G09G 2360/145* (2013.01)

(58) Field of Classification Search
CPC ......... G09G 2330/021; G09G 2354/00; G09G 2360/145; G06V 40/1318
See application file for complete search history.

(56) References Cited

U.S. PATENT DOCUMENTS

2022/0026541 A1* 1/2022 Ozawa ................. H03K 17/941
2023/0213427 A1 7/2023 Seo et al.

* cited by examiner

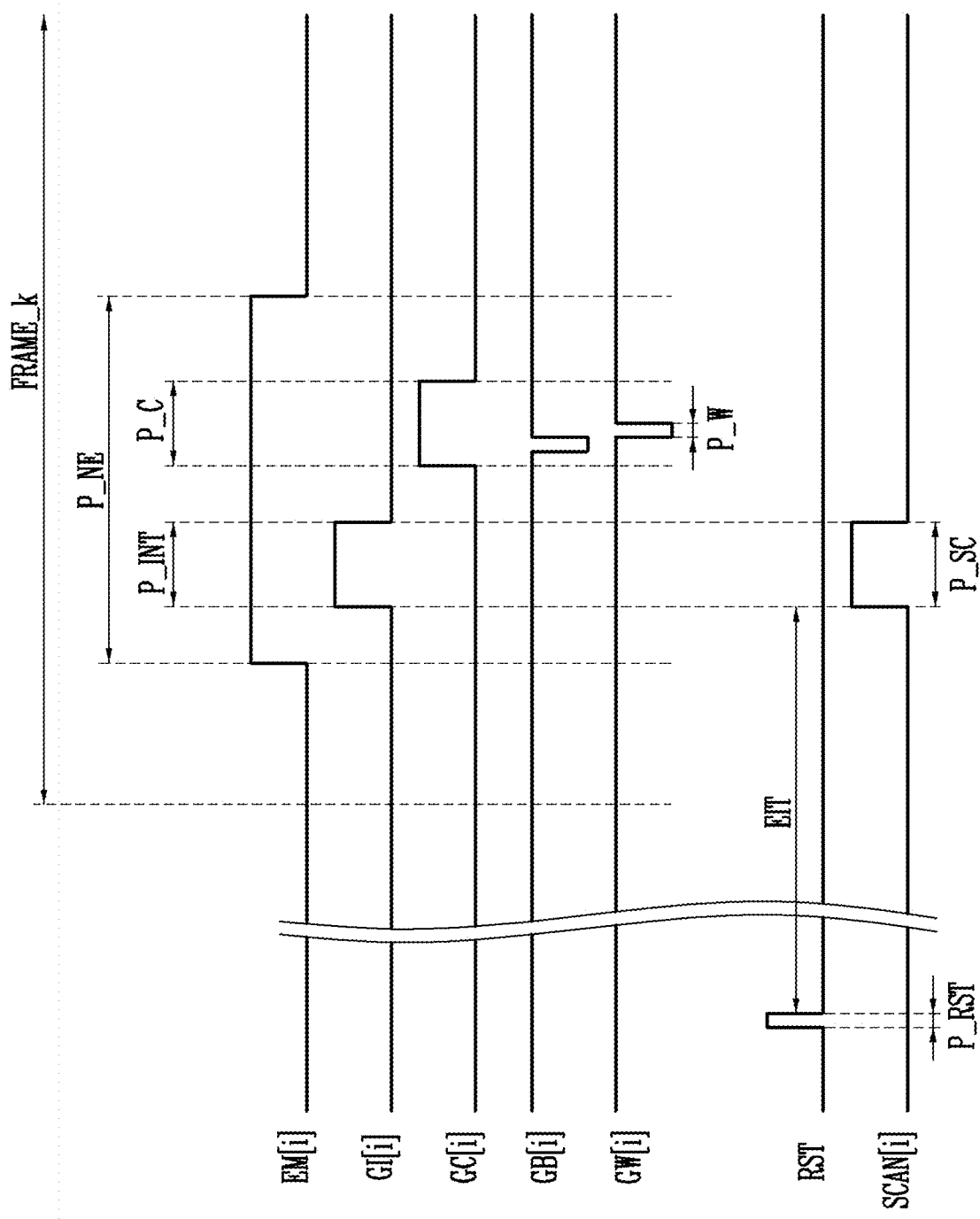

| TEMPERATURE[°C] | VSS [V] | VRST [V] |
|---|---|---|
| -40 | VSS16 | VRST16 |
| -30 | VSS15 | VRST15 |
| -20 | VSS14 | VRST14 |
| -10 | VSS13 | VRST13 |
| 0 | VSS12 | VRST12 |
| 10 | VSS11 | VRST11 |
| 25 | RVSS | RVRST |
| 35 | VSS21 | VRST21 |
| 45 | VSS22 | VRST22 |

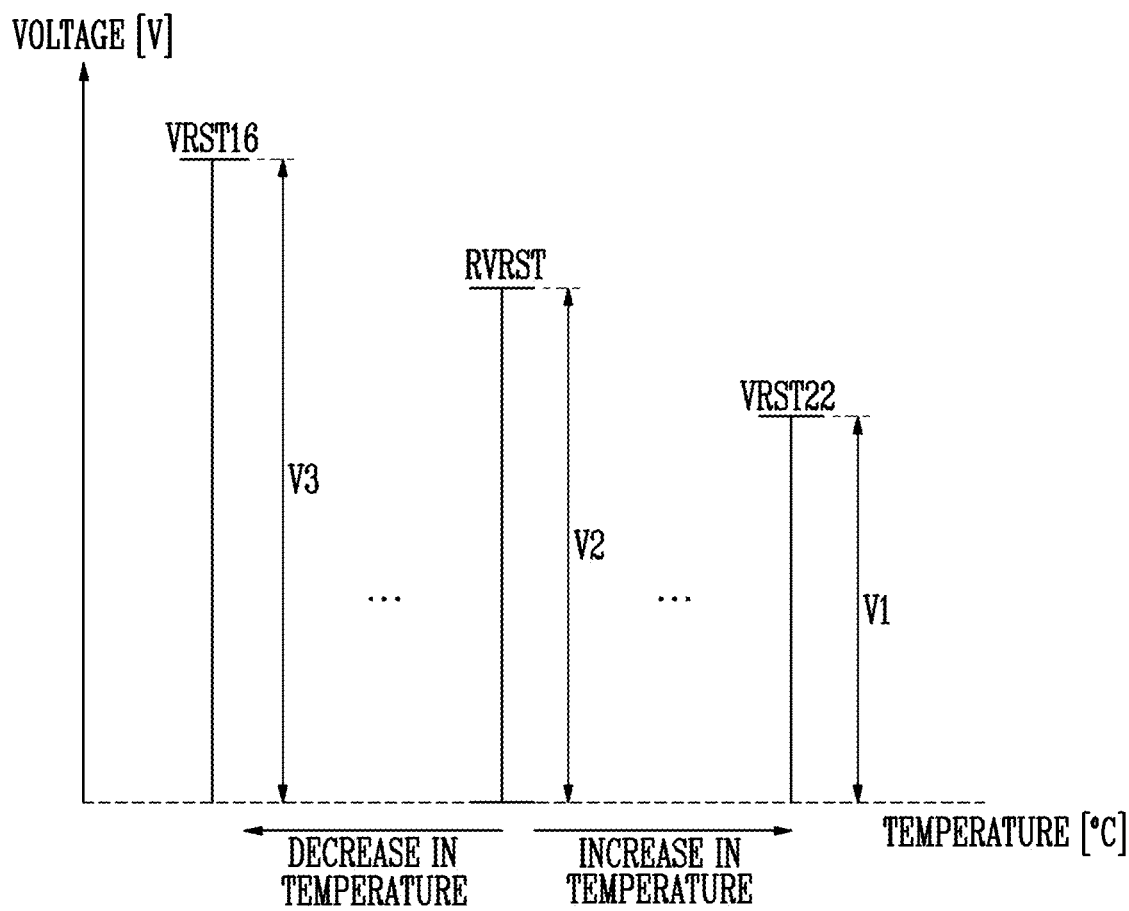

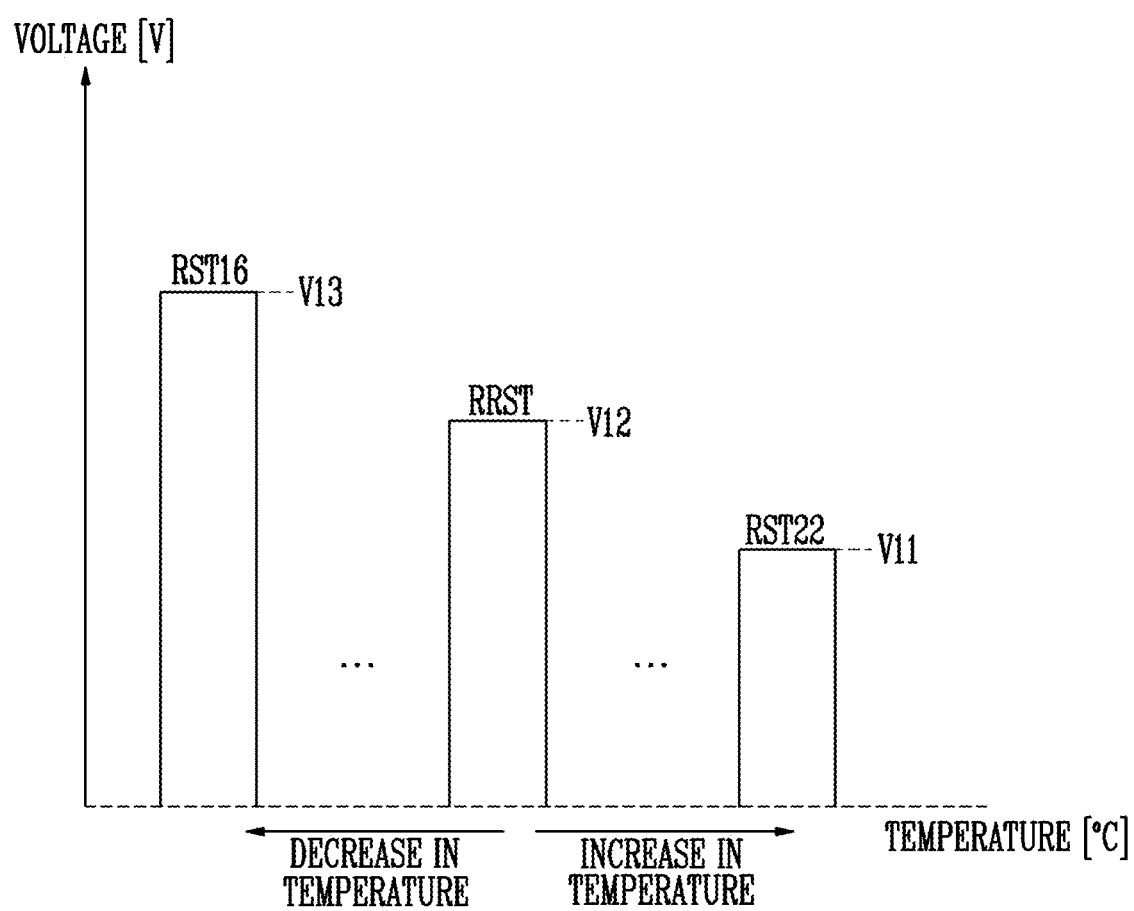

DISPLAY DEVICE AND METHOD OF DRIVING THE SAME, AND ELECTRONIC DEVICE INCLUDING DISPLAY DEVICE FOR CONTROLLING VOLTAGES BASED ON TEMPERATURE OF DISPLAY PANEL

CROSS-REFERENCE TO RELATED APPLICATION

The present application claims priority under 35 U.S.C. § 119(a) to Korean patent application No. 10-2023-0152577, filed on Nov. 7, 2023 in the Korean Intellectual Property Office, the disclosure of which is incorporated by reference in its entirety herein.

1. Technical Field

The present disclosure is directed to a display device and a method of driving the same, and an electronic device including the display device.

2. Discussion of Related Art

A display device is a connection medium between a user and information. Examples of the display device include a liquid crystal display device and an organic light emitting display device. The display device may be applied to various electronic devices such as smartphones, digital cameras, notebook computers, navigation systems, and smart televisions.

A display panel of the display device may include a photo sensor to detect a fingerprint and/or an illumination intensity. However, characteristics of light receiving elements included in the photo sensor may be change according to temperature, thereby making it more difficult to detect the fingerprint and/or the illumination intensity.

SUMMARY

Embodiments provide a display device and a method of driving the same, in which a voltage supplied to a photo sensor is changed based on temperature, so that the accuracy of sensing can be increased, and an electronic device including the display device.

In accordance with an embodiment of the present disclosure, there is provided a display device including: a display panel, at least one temperature sensor, a power supply, and a controller. The display panel includes pixels each including a light emitting element located between a first power source receiving a first power voltage and a second power line receiving a second power voltage, and photo sensors each including a light receiving element located between a third power line receiving a reset voltage and the second power line. The at least one temperature sensor is configured to sense a temperature of the display panel. The power supply is configured to supply the first power voltage, the second power voltage, and the reset voltage. The controller is connected to the temperature sensor and the power supply. The controller controls the power supply such that a voltage value of the reset voltage is changed based on the temperature of the display panel.

The power supply may change the reset voltage such that a voltage difference between the reset voltage and the second power voltage is decreased when the temperature of the display panel increases.

The power supply may increase a voltage value of the second power voltage when the temperature of the pixel unit increases.

The power supply may change the reset voltage such that a voltage difference between the reset voltage and the second power voltage is increased when the temperature of the display panel decreases.

The power supply may decrease a voltage value of the second power voltage when the temperature of the display panel decreases.

The controller may further include a storage device configured to store a lookup table including voltage values of the second power voltage and voltage values of the reset voltage, which correspond to a plurality of temperature values.

Each of the photo sensors may include: a second transistor connected between the first power line and a first node, the second transistor including a gate electrode connected to a reset control line; the light receiving element connected between the first node and the second power line; a first transistor including a first electrode connected to a fourth power line receiving a common voltage and a gate electrode connected to the first node; and a third transistor connected between a second electrode of the first transistor and a readout line, the third transistor including a gate electrode connected to a sensing scan line.

The display device may further include: a reset circuit configured to generate a reset signal supplied to the reset control line, using a gate-on voltage supplied from the power supply; a sensing scan driver configured to supply a sensing scan signal to the sensing scan line; and a readout circuit configured to receive a sensing signal from the readout line.

The controller may control the power supply such that a voltage value of the gate-on voltage is changed based on the temperature of the display panel.

The power supply may decrease the voltage value of the gate-on voltage when the temperature of the display panel increases, and increase the voltage value of the gate-on voltage when the temperature of the display panel decreases.

The controller may further include a storage device configured to store a lookup table including voltage values of the second power voltage, voltage values of the reset voltage, and voltage values of the gate-on voltage, which correspond to a plurality of temperature values.

The display panel may be divided into at least two blocks, and photo sensors located in the blocks different from each other may be connected to different reset control lines.

Photo sensors included in a first block among the at least two blocks may be connected to a first reset control line, and photo sensors included in a second block different from the first block among the at least two blocks may be connected to a second reset control line. The first reset control line may be supplied with a first reset signal from a first reset circuit, and the second reset control line may be supplied with a second reset signal from a second reset circuit.

The power supply may supply a first gate-on voltage to the first reset circuit based on a temperature of the first block, and supply a second gate-on voltage to the second reset circuit based on a temperature of the second block.

In accordance with another aspect of the present disclosure, there is provided a method of driving a display device including photo sensors each having a light receiving element located between a first power line receiving a reset voltage and a second power line receiving a second power voltage, the method including: sensing a temperature of a display panel including the photo sensors; and changing voltage values of the reset voltage and the second power voltage, which are supplied to the photo sensors, based on the temperature of the display panel.

In the changing of the voltage values of the reset voltage and the second power voltage, the reset voltage and the second power voltage may be controlled such that a voltage difference between the reset voltage and the second power voltage is decreased when the temperature of the display panel increases, and be controlled such that the voltage difference between the reset voltage and the second power voltage is increased when the temperature of the pixel unit decreases.

Each of the photo sensors may include an N-type transistor connected between the first power line and the light receiving element, the N-type transistor being turned on by a reset signal. A voltage value of the reset signal may be changed based on the temperature of the display panel.

A voltage value of a gate-on voltage of the reset signal may be decreased when the temperature of the display panel increases, and be increased when the temperature of the display panel decreases.

The display panel may be divided into a plurality of blocks, and a voltage of a reset signal supplied to each of the plurality of blocks may be changed corresponding to the temperature of the display panel.

In accordance with another aspect of the present disclosure, there is provided an electronic device including: a display panel, a voltage generating circuit, a temperature sensor, and a controller. The display panel includes pixels and photo sensors. The voltage generating circuit is configured to supply a first power voltage and a second power voltage to the pixels, and supply a reset voltage and the second power voltage to the photo sensors. The temperature sensor is configured to sense a temperature of the display panel. The controller is configured to control the voltage generating circuit based on the temperature of the display panel, which is sensed by the temperature sensor. The controller controls the voltage generating circuit such that voltage values of the reset voltage and the second power voltage are changed corresponding to the temperature of the display panel.

BRIEF DESCRIPTION OF THE DRAWINGS

FIG. 5 is a waveform diagram illustrating an embodiment of operations of the pixel and the photo sensor, which are shown in FIG. 4.

FIG. 9 is a diagram illustrating a voltage difference corresponding to the voltage information shown in FIG. 8.

FIG. 10 is a diagram illustrating an embodiment of a lookup table stored in the storage unit shown in FIG. 7.

FIG. 11 is a diagram illustrating a voltage of a reset signal shown in FIG. 10.

DETAILED DESCRIPTION

Figure 1:
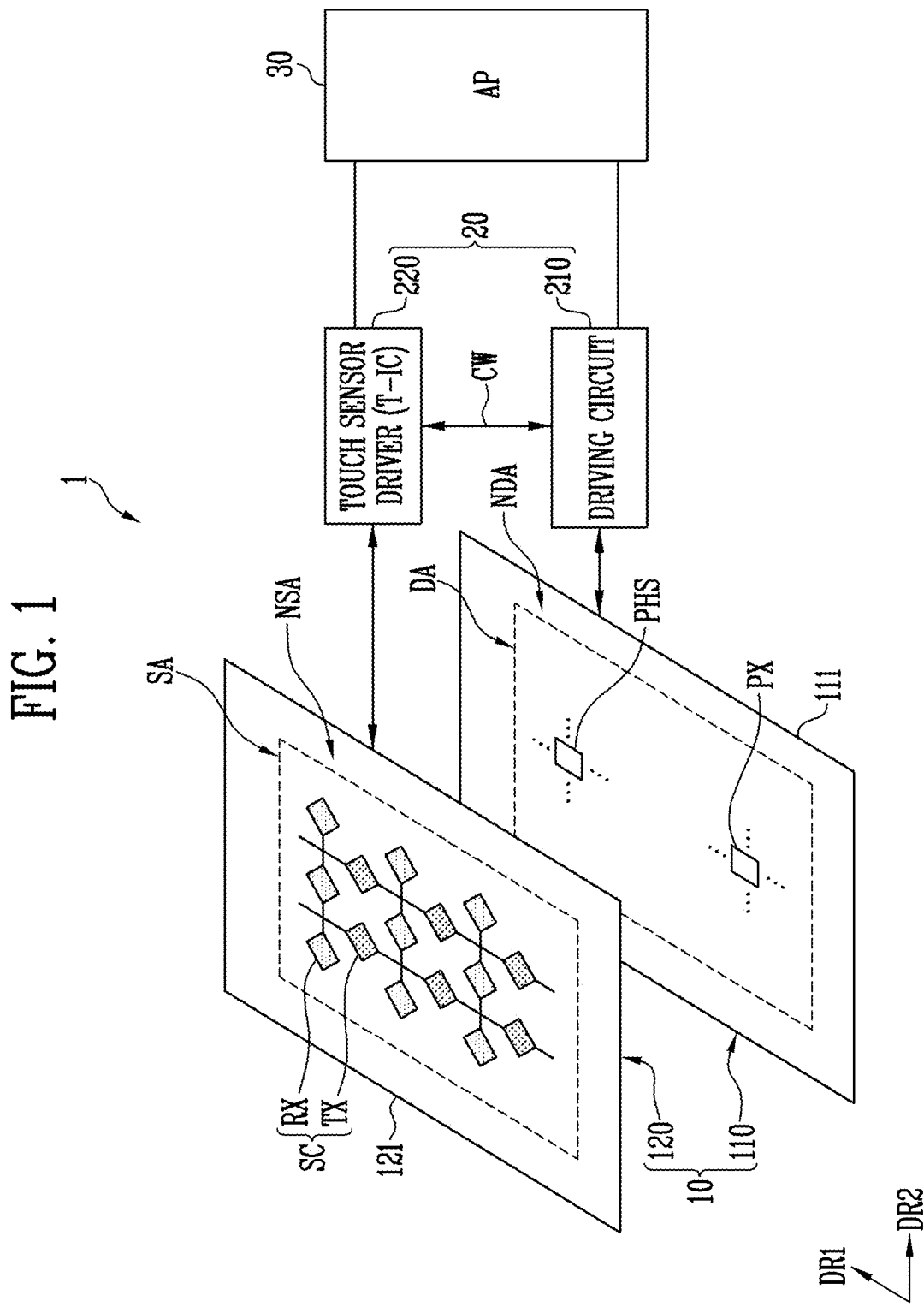
FIG. 1 is a diagram illustrating a display device in accordance with an embodiment of the present disclosure.

Hereinafter, exemplary embodiments are described in detail with reference to the accompanying drawings so that those skilled in the art may practice the present disclosure. However, the present disclosure may be implemented in various different forms and is not limited to the exemplary embodiments described in the present specification.

Parts not relevant to the description may be omitted to clearly describe the present disclosure, and the same or similar constituent elements will be designated by the same reference numerals throughout the specification. Therefore, the same reference numerals may be used in different drawings to identify the same or similar elements.

In the description, the expression "equal" may mean "substantially equal." That is, this may mean equality to a degree to which those skilled in the art can understand the equality. Other expressions may be expressions in which "substantially' is omitted.

Some embodiments are described in the accompanying drawings in relation to functional blocks, units, and/or modules. Those skilled in the art will understand that these blocks, units, and/or modules may be physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules may be programmed and controlled by using software, to perform various functions discussed in the present disclosure, and may be selectively driven by firmware and/or software. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the present disclosure. Also, in some embodiments, the blocks, the units, and/or the modules may be physically separated into more complex blocks, more complex units, and/or more complex modules without departing from the scope of the present disclosure.

Meanwhile, the present disclosure is not limited to embodiments disclosed below, and may be implemented in various forms. Each embodiment disclosed below may be independently embodied or be combined with at least another embodiment prior to being embodied.

Figure 2:
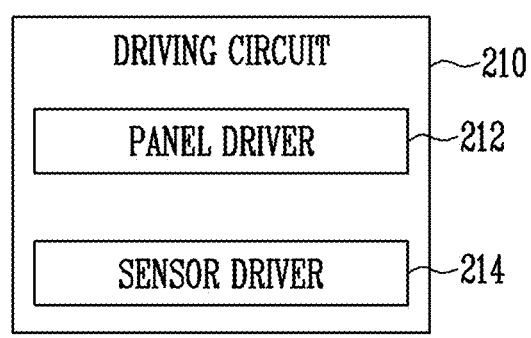
FIG. 2 is a diagram illustrating an embodiment of a driving circuit shown in FIG. 1.

FIG. 1 is a diagram illustrating a display device in accordance with an embodiment of the present disclosure. FIG. 2 is a diagram illustrating an embodiment of a driving circuit shown in FIG. 1.

Referring to FIG. 1, the display device 1 may be applied to electronic devices such as a computer, a notebook computer (laptop), a cellular phone, a smart phone, a Personal Digital Assistant (PDA), a Portable Multimedia Player (PMP), a digital TV, a digital camera, a portable game console, a navigation device, a wearable device, an Internet of Things (IoT) device, an Internet of Everything (IoE) device, an electronic-book (e-book), a virtual reality (VR) device, an augmented reality (AR) device, a vehicle navigation system, a video phone, an observation system, an auto-focus system, a tracking system, and a movement sensing system.

The display device 1 may include a panel 10 and a driving circuit unit 20 for driving the panel 10. Also, the display device 1 may further include an application processor (AP) 30, or be connected to the application processor 30.

The panel 10 may include a display unit 110 (or display panel) and a sensor unit 120 (or sensor panel 120). The display unit 110 may display an image, and sense a touch input (e.g., fingerprint sensing). The sensor unit 120 may sense (or detect) an external input such as a touch, a pressure, a fingerprint, or hovering. For example, the panel 10 may include pixels PX and photo sensors PHS, and sensors SC (or touch sensors) located while overlapping with at least some of the pixels PX and the photo sensors PHS. In an embodiment, the sensors SC may include first sensors TX (or driving electrodes) and second sensors RX (or sensing electrodes). In another embodiment (e.g., a self-capacitance manner), the sensors SC may be configured with one type of sensor without distinguishing the first sensors TX and the second sensors RX from each other.

The driving circuit unit 20 may include a driving circuit 210 for driving the display unit 110 and a touch sensor driver 220 for driving the sensor unit 120. For example, the pixels PX may display an image by using a display frame period as a unit. For example, the sensors SC may sense an input of a user by using a sensing frame period as a unit. The sensing frame period and the display frame period may be independent from each other or be different from each other. The sensing frame period and the display frame period may be synchronized with each other or be unsynchronized.

In some embodiments, after the display unit 110 and the sensor unit 120 are manufactured separately from each other, the display unit 110 and the sensor unit 120 may be disposed and/or coupled to overlap with each other in at least one area. In another embodiment, the display unit 110 and the sensor unit 120 may be integrally manufactured. For example, the sensor unit 120 may be formed directly on at least one substrate (e.g., an upper substrate and/or a lower substrate of a display panel, or a thin film encapsulation layer) which constitutes the display unit 110, or another insulating layer or one of various types of functional layers (e.g., an optical layer or a protective layer).

While the sensor unit 120 is illustrated in FIG. 1 as being disposed on a front surface (e.g., an upper surface on which an image is displayed) of the display unit 110, the position of the sensor unit 120 is not limited thereto. For example, the sensor unit 120 may be disposed on a rear surface or both surfaces of the display unit 110. In another embodiment, the sensor unit 120 may be disposed in at least one edge area of the display unit 110.

The display unit 110 may include a display substrate 111 and a plurality of pixels PX and a plurality of photo sensors PHS, which are formed on the display substrate 111. The pixels PX may be disposed in a display area DA of the display substrate 111. The photo sensors PHS may be disposed in the display area DA of the display substrate 111.

The display substrate 111 may include the display area DA in which an image is displayed and a non-display area NDA disposed at the periphery of the display area DA in which an image is not displayed. In some embodiments, the display area DA may be disposed in a central area of the display unit 110, and the non-display area NDA is disposed in an edge area of the display unit 110 to surround the display area DA.

The display substrate 111 may be a rigid substrate or a flexible substrate, but the material or property of the display substrate 111 is not limited thereto. For example, the display substrate 111 may be a rigid substrate made of glass or tempered glass, or a flexible substrate configured with a thin film made of plastic or metal.

The pixels PX may be disposed in the display area DA. The pixels PX may display a predetermined image, corresponding to a data signal. In the present disclosure, the structure, driving method, and the like of the pixels PX are not particularly limited. For example, each of the pixels PX may be implemented as a pixel having various structures and/or various driving methods.

The photo sensors PHS may be included in the display area DA. The photo sensor PHS may be designated as a sensor pixel. The photo sensors PHS may include a light receiving element including a light receiving layer. In the display area DA, the light receiving layer of the light receiving element may be disposed to be spaced apart from a light emitting layer of a light emitting element.

In an embodiment, the plurality of photo sensors PHS may be distributed throughout the entire area of the display area DA while being spaced apart from each other. However, this is merely illustrative. For example, some of the photo sensors PHS may be included in at least a portion of the non-display area NDA.

In an embodiment, the photo sensors PHS are configured to sense that light emitted from a light source (e.g., a light emitting element of each of the pixels PX) is reflected by an external object (e.g., a finger of a user, or the like). For example, a fingerprint of the user may be sensed through the photo sensors PHS. For example, an illumination intensity may be sensed through the photo sensors PHS. In various embodiments, the photo sensors PHS may sense various biometric information such as an iris and a vein.

Various types of lines and/or a built-in circuit, connected to the pixels PX and/or the photo sensors PHS of the display area DA, may be disposed in the non-display area NDA. In an example, a plurality of lines for supplying various power sources (or power supply voltages) and various control signals to the display area DA may be disposed in the non-display area NDA. In addition, a scan driver may be further disposed in the non-display area NDA.

In the present disclosure, the type of the display unit 110 is not particularly limited. For example, the display unit 110 may be implemented as a self-luminous display panel such as an organic light emitting display panel. However, when the display unit 110 is implemented as a self-luminescent display panel, each of the pixels PX is not necessarily limited to a case where the pixel includes only an organic light emitting element. For example, the light emitting element of each of the pixels PX may be configured as an organic light emitting diode, an inorganic light emitting diode, a quantum dot/well light emitting diode, or the like. In some embodiments, a plurality of light emitting elements may be provided in each of the pixels PX. The plurality of light emitting elements may be connected in series, parallel, or series/parallel.

The sensor unit 120 may include a sensor substrate 121 and a plurality of sensors SC formed on the sensor substrate 121. The sensors SC may be disposed in a sensing area SA on the sensor substrate 121.

The sensor substrate 121 may include the sensing area SA capable of sensing a touch input or the like and a peripheral area NSA disposed at the periphery of the sensing area SA. In some embodiments, the sensing area SA may be disposed to overlap with at least one area of the display area DA. In an example, the sensing area SA may be set as an area corresponding to the display area DA (e.g., an area overlapping with the display area DA), and the peripheral area NSA may be set as an area corresponding to the non-display area NDA (e.g., an area overlapping with the non-display area NDA). When a touch input or the like is provided on the display area DA, the touch input may be detected through the sensor unit 120.

The sensor substrate 121 may be a rigid or flexible substrate. In addition, the sensor substrate 121 may be configured with at least one insulating layer. Also, the sensor substrate 121 may be a transparent or translucent light transmission substrate, but the present disclosure is not limited thereto. That is, in the present disclosure, the material and property of the sensor substrate 121 are not particularly limited. In some embodiments, at least one substrate (e.g., the display substrate 111, an encapsulation substrate, and/or a thin film encapsulation layer) which constitutes the display unit 110, or at least one insulating layer, at least one functional layer, or the like, which is disposed at the inside and/or an outer surface of the display 110, may be used as the sensor substrate 121.

The sensing area SA is set as an area capable of reacting or responding to a touch input (i.e., an active area of sensors). The sensors SC for sensing a touch input or the like may be disposed in the sensing area SA. In some embodiments, the sensors SC may include the first sensors TX and the second sensors RX.

For example, each of the first sensors TX may extend in a first direction DR1. The first sensors TX may be arranged in a second direction DR2. The second direction DR2 may be different from the first direction DR1. For example, the second direction DR2 may be a direction orthogonal to the first direction DR1. Each of the first sensors TX may have a form in which first cells having a relatively wide area and first bridges having a relatively narrow area are connected to each other. Although each of the first cells is illustrated in FIG. 1 has having a diamond shape, each of the first cells may be configured in various shapes including a circular shape, a quadrangular shape, a triangular shape or a mesh shape. For example, the first bridges may be integrally formed with the first cells on the same layer. In another embodiment, the first bridges may be formed in a layer different from a layer of the first cells, to electrically connect adjacent first cells to each other.

For example, each of the second sensors RX may extend in the second direction DR2. The second sensors RX may be arranged in the first direction DR1. Each of the second sensors RX may have a form in which second cells (or sensing electrodes) having a relatively wide area and second bridges having a relatively narrow area are connected to each other. Although each of the second cells are illustrated in FIG. 1 as having a diamond shape, each of the second cells may be configured in various shapes including a circular shape, a quadrangular shape, a triangular shape or a mesh shape. For example, the second bridges may be integrally formed with the second cells on the same layer. In another embodiment, the second bridges may be formed in a layer different from a layer of the second cells, to electrically connect adjacent second cells to each other.

In some embodiments, each of the first sensors TX and the second sensors RX may include at least one of a metal material, a transparent conductive material, and various other conductive materials, thereby having conductivity. In an example, the first sensors TX and the second sensors RX may include at least one of various metal materials including gold (Au), silver (Ag), aluminum (Al), molybdenum (Mo), chromium (Cr), titanium (Ti), nickel (Ni), neodymium (Nd), copper (Cu), platinum (Pt), and the like, or alloys thereof. The first sensors TX and the second sensors RX may be configured in a mash shape. Also, the first sensors TX and the second sensors RX may include at least one of various transparent conductive materials including silver nano wire (AgNW), Indium Tin Oxide (ITO), Indium Zinc Oxide (IZO), Indium Gallium Zinc Oxide (IGZO), Antimony Zinc Oxide (AZO), Indium Tin Zinc Oxide (ITZO), Zinc Oxide (ZnO), Tin Oxide ($SnO_2$), carbon nano tube, graphene, and the like. In addition, the first sensors TX and the second sensors RX may include at least one of various conductive materials, thereby having conductivity. While each of the first sensors TX and the second sensors RX may be configured as a single layer or a multi-layer, and a sectional structure thereof is not limited thereto.

Meanwhile, sensor lines for electrically connecting the first and second sensors TX and RX to the touch sensor driver 220, and the like may be concentrically disposed in the peripheral area NSA.

The driving circuit unit 20 may include the driving circuit 210 for driving the display unit 110 and the touch sensor driver 220 for driving the sensor unit 120. In an embodiment, the touch sensor driver 220 may be implemented as an Integrated Circuit (IC) (e.g., a sensor IC (T-IC)).

The touch sensor driver 220 may be electrically connected to the sensor unit 120 to drive the sensor unit 120. The touch sensor driver 220 may include a sensor transmitter and a sensor receiver. In some embodiments, the sensor transmitter and the sensor receiver may be integrated inside one IC, but the present disclosure is not limited thereto.

In an embodiment, the touch sensor driver 220 may periodically set/update offset data (or a base line) corresponding to a state in which any input is not caused by an object, and sense the input caused by the object by reflecting the offset data in a sensing signal, to accurately detect an input caused by the object.

The driving circuit 210 may include a panel driver 212 and a sensor driver 214 as shown in FIG. 2. The panel driver 212 and the sensor driver 214 may be implemented as ICs independent from each other or be implemented into one IC. For example, at least a portion of the sensor driver 214 may be included in the panel driver 212, or operate in cooperation with the panel driver 212.

The panel driver 212 may scan the pixels PX of the display area DA, and supply, to the pixels PX, a data signal corresponding to image data (or an image). The display unit 110 may display an image corresponding to the data signal.

For example, the panel driver 212 may provide a data signal to the pixels PX. In an embodiment, the panel driver 212 may include a data driver (e.g., a first driver circuit) and a timing controller (e.g., a controller circuit), and a scan driver (e.g., a second driver circuit) may be separately mounted in the non-display area NDA of the display unit 110. In an embodiment, the panel driver 212 may include all or at least some of the data driver, the timing controller, and the scan driver.

In an embodiment, the panel driver 212 may supply a driving signal for photo sensing (e.g., fingerprint sensing) to the pixels PX. The driving signal may be provided to allow the pixels PX to emit light, thereby operating as a light source for the photo sensors PHS. In an embodiment, the panel driver 212 may supply the driving signal for photo sensing and/or another driving signal to the photo sensors PHS. However, this is merely illustrative, and driving signals for photo sensing may be provided by the sensor driver 214.

The sensor driver 214 may detect biometric information such as a fingerprint of a user, based on a sensing signal received from the photo sensors PHS. Additionally, the sensor driver 214 may sense an illumination intensity, based on the sensing signal received from the photo sensors PHS.

The application processor 30 may be electrically connected to the display driver 210, and provide the display driver 210 with grayscales for the display frame period and timing signals. Also, the application processor 30 may be electrically connected to the touch sensor driver 220, and receive a sensing signal from the touch sensor driver 220 or receive input information (e.g., an input caused by an object and a position thereof).

The application processor 30 may correspond to at least one of a Graphics Processing Unit (GPU), a Central Processing Unit (CPU), an Application Processor (AP), and the like.

Figure 3:
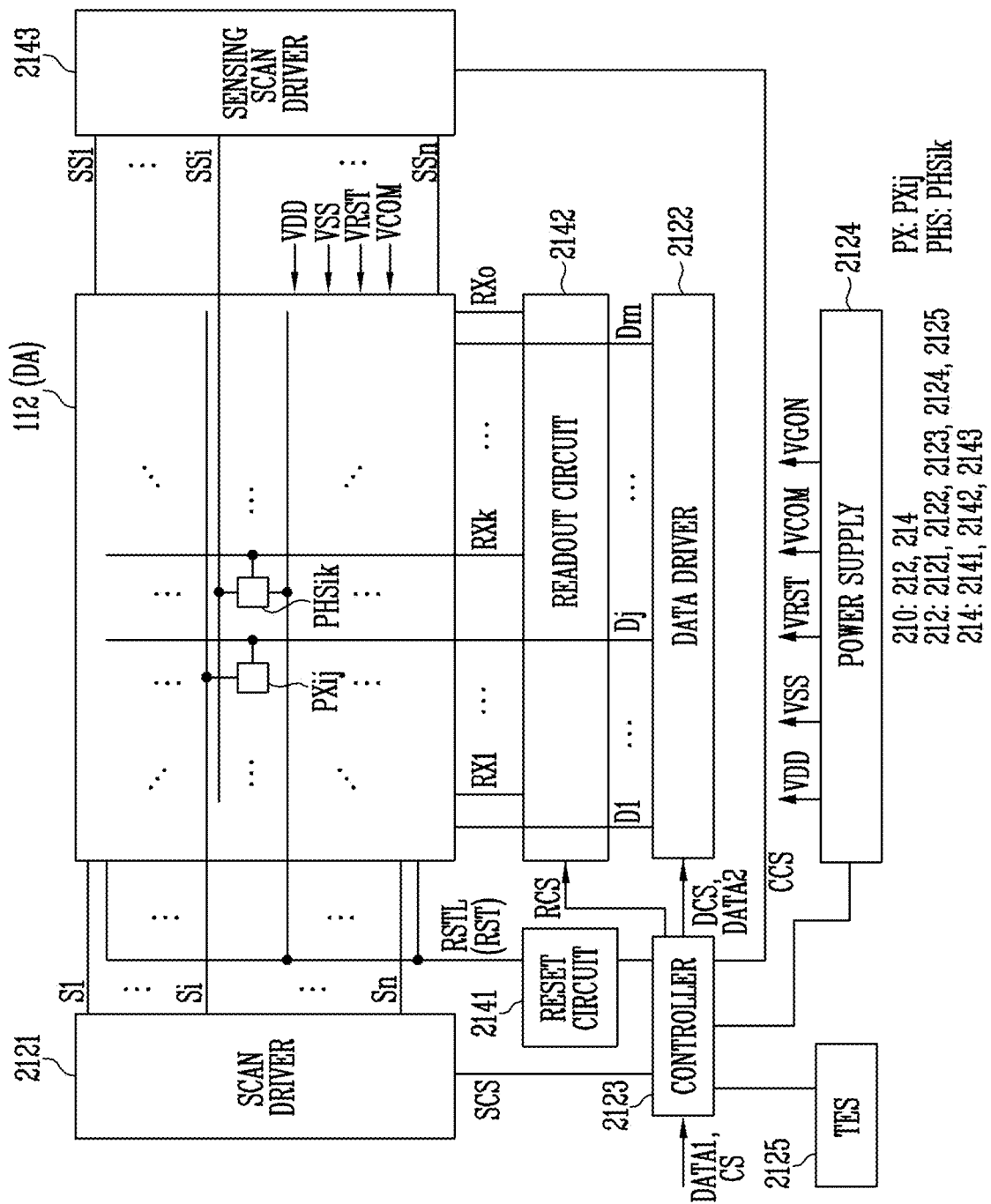
FIG. 3 is a diagram illustrating an embodiment of a display unit and the driving circuit, which are included in the display device shown in FIG. 1.

FIG. 3 is a diagram illustrating an embodiment of the display unit (e.g., 110) and the driving circuit (e.g., 20), which are included in the display device shown in FIG. 1.

Referring to FIGS. 1 to 3, a pixel unit 112 may include signal lines, pixels PX, and photo sensors PHS. The signal lines may include scan lines S1, . . . , Si, . . . , and Sn, data lines D1, . . . , Dj, . . . , and Dm, readout lines RX1, . . . , RXk, . . . , and RXo, sensing scan lines SS1, . . . , SSi, . . . , and SSn, and a reset control line RSTL (or reset line). Here, each of n, m, and o may be a natural number of 2 or more.

The pixels PX may be disposed or located in areas (e.g., pixel areas) defined by the scan lines S1 to Sn and the data lines D1 to Dm. The photo sensors PHS may be disposed or located in areas defined by the sensing scan lines SS1 to SSn and the readout lines RX1 to RXo. The pixels PX and the photo sensors PHS may be arranged in a two-dimensional array in the display area DA, but the present disclosure is not limited thereto.

Each of the pixels PX may be electrically connected to at least one of the scan lines S1 to Sn and one of the data lines D1 to Dm. Each of the photo sensors PHS may be electrically connected to one of the sensing scan lines SS1 to SSn, one of the readout lines RX1 to RXo, and the reset control line RSTL. A connection configuration between the pixels PX, the photo sensors PHS, and the signal lines will be described later with reference to FIG. 4.

The driving circuit 210 may include a scan driver 2121, a data driver 2122, a controller 2123 (or timing controller), a power supply 2124, a temperature sensor (TES) 2125, a reset circuit 2141, a readout circuit 2142, and a sensing scan driver 2143.

For example, the scan driver 2121, the data driver 2122, the controller 2123, the power supply 2124, and the TES 2125 may be included in the panel driver 212, and the reset circuit 2141, the readout circuit 2142, and the sensing scan driver 2143 may be included in the sensor driver 214. However, the present disclosure is not limited thereto. For example, the reset circuit 2141 may be included in the panel driver 212.

The scan driver 2121 may be electrically connected to the pixels PX through the scan lines S1 to Sn. The scan driver 2121 may generate scan signals, based on a scan control signal SCS (or gate control signal), and provide the scan signals to the scan lines S1 to Sn. The scan control signal SCS may include a start signal, clock signals, and the like, and be provided to the scan driver 2121 from the controller 2123.

The scan driver 2121 may be formed together with the pixels PX. However, the scan driver 2121 is not limited thereto. For example, the scan driver 2121 may be implemented as an integrated circuit.

A pixel selectively driven by the scan driver 2121 may emit light with a luminance corresponding to a data signal provided from a data line. For example, a pixel PXij selectively driven through an ith scan line Si may emit light with a luminance corresponding to a data signal provided from a jth data line Dj (each of i and j is a natural number).

The data driver 2122 may generate a data signal (or data voltage), based on image data DATA2 and a data control signal DCS, which are provided from the controller 2123, and provide the data signal to the pixel unit 112 (or the pixels PX) through the data lines D1 to Dm. The data control signal DCS is a signal for controlling an operation of the data driver 2122, and may include a data enable signal (or load signal) for indicating an output of a valid data signal, a horizontal start signal, a data clock signal, and the like.

The controller 2123 may receive input image data DATA1 and a control signal CS from an external device (e.g., a graphic processor or an application processor), generate the scan control signal SCS and the data control signal DCS, based on the control signal CS, and generate the image data DATA2 by converting the input image data DATA1. The control signal CS may include a vertical synchronization signal, a horizontal synchronization signal and a reference clock signal. The vertical synchronization signal may indicate a start of frame data (i.e., data corresponding to a frame period in which one frame image is displayed), and the horizontal synchronization signal may indicate a start of a data row (i.e., one data row among a plurality of data rows included in the frame data). The controller 2123 may convert the input image data DATA1 into the image data DATA2 having a format corresponding to a pixel arrangement in the pixel unit 112. Also, the controller 2123 may generate a reset control signal, a readout control signal RCS, and a sensing control signal CCS, based on the control signal CS.

In an embodiment, the controller 2123 controls the power supply 2124 such that a second power voltage VSS supplied to the pixels PX and the photo sensors PHS is changed based on a temperature of the pixel unit 112, which is sensed by the TES 125. The second power voltage VSS may be changed corresponding to a characteristic of a light emitting element LD shown in FIG. 4. In an example, when the temperature of the pixel unit 112 increases, the second power voltage VSS may be increased.

In an embodiment, the controller 2123 controls the power supply 2124 such that a voltage supplied to the photo sensors PHS is changed based on the temperature of the pixel unit 112, which is sensed by the temperature sensor 2125. When the voltage supplied to the photo sensors PHS is controlled corresponding to the temperature, a sensing error of the photo sensors PHS, which corresponds to a temperature change, can be minimized.

Figure 4:
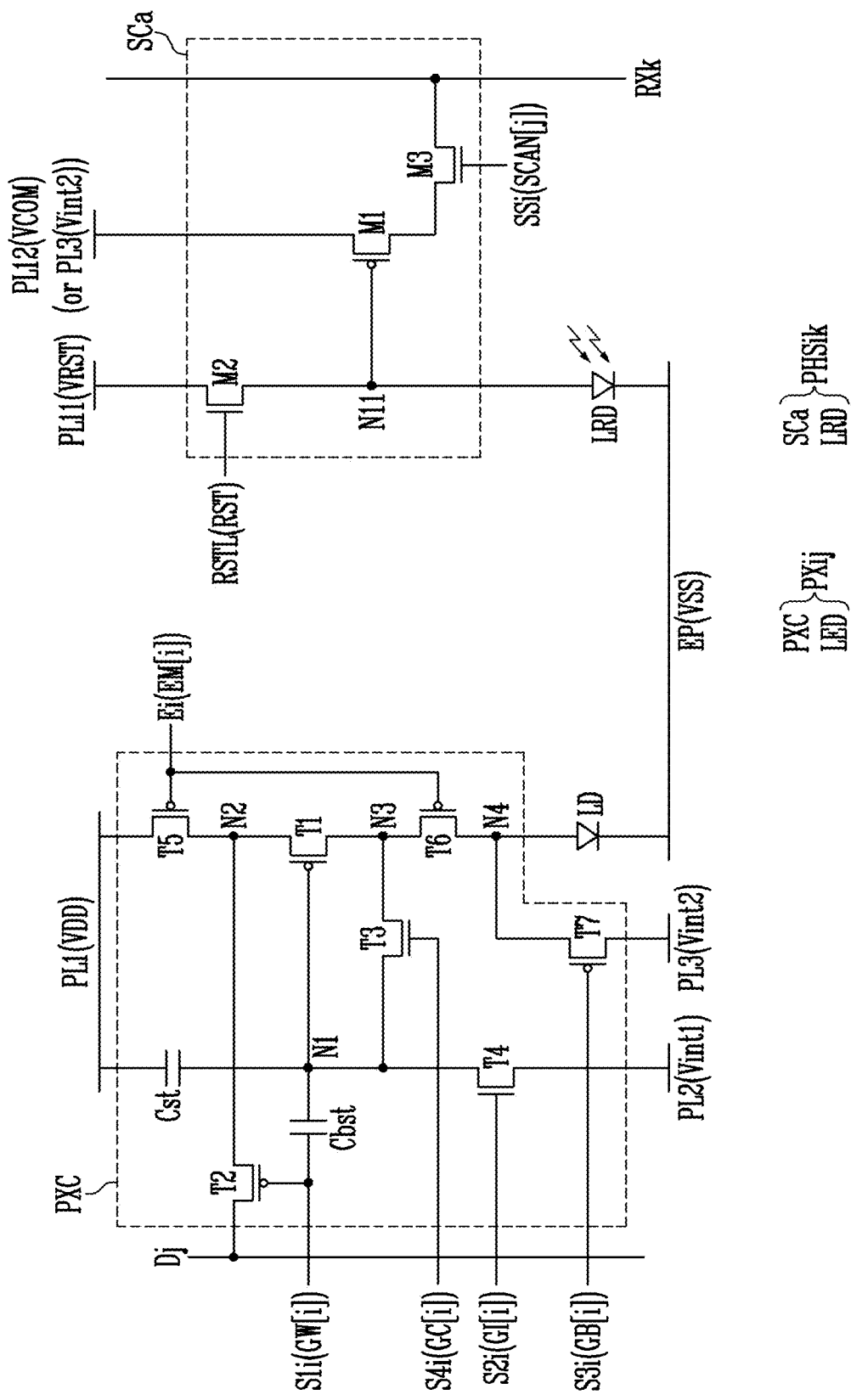
FIG. 4 is a circuit diagram illustrating an embodiment of a pixel and a photo sensor, which are shown in FIG. 3.

A light receiving element LRD may be included in each of the photo sensors PHS as shown in FIG. 4. An amount of current flowing through the light receiving element LRD may be changed based on the temperature. In an example, when the temperature of the pixel unit 112 increases, the amount of current flowing through the light receiving element LRD may be increased. When the amount of current flowing through the light receiving element LRD is changed corresponding to the temperature, the sensing accuracy of the photo sensor PHS may become low.

In an embodiment of the present disclosure, the controller 2123 controls the power supply 2124, based on the temperature of the pixel unit 112, which is sensed by the TES 2125. The power supply 2124 may control a reset voltage VRST and/or a gate-on voltage VGON, supplied to the photo sensors PHs such that the amount of current flowing through the light receiving element LRD is roughly similar (or equally) maintained regardless of the temperature change of the pixel unit 112, corresponding to the control of the controller 2123.

The power supply 2124 may supply power voltages VDD, VSS, VRST, VCOM, and VGON for driving of the pixels PX and the photo sensors PHS. In FIG. 3, some power voltages VDD, VSS, VRST, VCOM, and VGON generated by the power supply 2124 are illustrated. The power supply 2124 may additionally generate various power voltages, corresponding to structures of the pixels PX and the photo sensors PHS.

A first power voltage VDD may be a power source which supplies a driving current to the pixels PX. The second power voltage VSS may be a power source which is supplied with a driving current from the pixels PX. The first power voltage VDD may be set as a voltage higher than the second power voltage VSS during a period in which the pixels PX are set to be in an emission state. The reset voltage VRST may be a voltage for initializing the photo sensors PHS. A common voltage VCOM may be a voltage supplied to the photo sensors PHS. The gate-on voltage VGON may be supplied to the reset circuit 2141.

In an embodiment, the power supply 2124 may control at least one voltage among the second power voltage VSS, the reset voltage VRST, and the gate-on voltage VGON, corresponding to the control of the controller 2123 (or corresponding to the temperature sensed by the TES 2125).

The TES 2125 may sense a temperature of the pixel unit 112, and supply sensed temperature information based on or indicating the sensed temperature to the controller 2123. The controller 2123 may control the power supply 2124, based on the temperature information of the pixel unit 112.

In an embodiment, the reset circuit 2141 is commonly connected to all the photo sensors PHS provided in the pixel unit 112 through one reset control line RSTL. The reset circuit 2141 may simultaneously provide a reset signal RST to the photo sensors PHS in response to a reset control signal. The reset signal RST may be a control signal for providing the reset voltage VRST to the photo sensors PHS. When the reset signal RST is simultaneously provided to the photo sensors, the reset signal RST may be designated as a global reset signal.

In an embodiment, the reset circuit 2141 generates the reset signal RST, using the gate-on voltage VGON. In an example, a high voltage of the reset signal RST may correspond to the gate-on voltage VGON. The gate-on voltage VGON may be changed based on the temperature of the pixel unit, and the reset circuit 2141 may supply the reset signal having different gate-on voltages VGON to the reset control line RSTL based on the temperature of the pixel unit 112.

The readout circuit 2142 may receive a sensing signal from the photo sensors PHS through the readout lines RX1 to RXo, and perform signal processing on the sensing signal. For example, the readout circuit 2142 may perform a Correlated Double Sampling (CDS) operation for removing noise from the sensing signal provided from the photo sensors PHS.

The sensing scan driver 2143 may be electrically connected to the photo sensors PHS through the sensing scan lines SS1, ..., SSi, ..., and SSn. The sensing scan driver 2143 may generate sensing scan signals, based on the sensing control signal CCS, and provide the sensing scan signals to the sensing scan lines SS1 to SSn. That is, the sensing scan driver 2143 may select the photo sensors PHS while scanning pixel unit 112. The sensing scan driver 2143 may be formed together with the photo sensors PHS in the pixel unit 112. However, the sensing scan driver 2143 is not limited thereto. For example, the sensing scan driver 2143 may be implemented as an integrated circuit.

A photo sensor selectively driven by the sensing scan driver 2143 may output, to a readout line, an electrical signal (i.e., a sensing signal, e.g., a current/voltage) corresponding to sensed light. For example, a photo sensor PHSik selectively driven through an ith sensing scan line SSi may output an electrical signal corresponding to sensed light to a kth readout line RXk (k is a natural number).

The readout circuit 2142 may convert a sensing signal in an analog form into a signal (or digital value) in a digital form. Read-out sensing signals (or sensing signals in the digital form) may be provided as one sensing data to an external device. In an embodiment, biometric authentication (e.g., fingerprint authentication) may be performed based on the sensing data.

FIG. 4 is a circuit diagram illustrating an embodiment of the pixel and the photo sensor, which are shown in FIG. 3. For convenience of description, a pixel PXij which is located on an ith horizontal line (or ith pixel row) and is connected to a jth data line Dj will be illustrated in FIG. 4. For convenience of description, a photo sensor PHSik which is located on the ith horizontal line (or ith pixel row) and is connected to a kth readout line RXk is illustrated in FIG. 4. The ith scan lines S1i to S4i may be included in the ith scan line Si shown in FIG. 3.

Referring to FIG. 4, the pixel PXij and the photo sensor PHSik may be located on the ith horizontal line. The pixel PXij may include a light emitting element LD and a pixel circuit PXC. In an embodiment, the pixel circuit PXC may include first, second, third, fourth, fifth, sixth, and seventh transistors T1, T2, T3, T4, T5, T6 and T7, a storage capacitor Cst, and a boost capacitor Cbst.

The first transistor T1 (or driving transistor) may be connected between a first power line PL1 and a first electrode of the light emitting element LD. The first transistor T1 may include a gate electrode connected to a first node N1. The first transistor T1 may control an amount of current (or driving current) flowing from the first power line PL1 to an electrode EP (or second power line) via the light emitting element LD, based on a voltage of the first node N1. A first power voltage VDD may be provided to the first power line PL1, and a second power voltage VSS may be provided to the electrode EP. In an embodiment, the first power voltage VDD is higher than the second power voltage VSS.

The second transistor T2 may be connected between the jth data line Dj and a second node N2. A gate electrode of the second transistor T2 may be connected to a 1ith scan line S1i (or first scan line). The second transistor T2 may be turned on when a first scan signal GW[i] (e.g., the first scan signal GW[i] having a low level) is supplied to the 1ith scan line S1i, to electrically connect the jth data line Dj and the second node N2 to each other. When each of the first transistor T1 and the third transistor T3 is in a turn-on state, the second transistor T2 may transfer a data signal of the jth data line Dj to the first node N1 in response to the first scan signal GW[i].

The third transistor T3 may be connected between the first node N1 and a third node N3. A gate electrode of the third transistor T3 may be connected to a 4ith scan line S4i (or second scan line). The third transistor T3 may be turned on when a fourth scan signal GC[i] is supplied to the 4ith scan line S4i. When the third transistor T3 is turned on, the first transistor T1 may be diode-connected.

The fourth transistor T4 may be connected between the first node N1 and a second power line PL2. A gate electrode of the fourth transistor T4 may be connected to a 2ith scan line S2i (or second scan line). A first initialization power voltage Vint1 may be provided to the second power line PL2. The fourth transistor T4 may be turned on by a second scan signal GI[i] supplied to the 2ith scan line S2i. When the fourth transistor T4 is turned on, the first initialization power voltage Vint1 may be supplied to the first node N1 (i.e., the gate electrode of the first transistor T1).

The fifth transistor T5 may be connected between the first power line PL1 and the second node N2. A gate electrode of the fifth transistor T5 may be connected to an ith emission control line Ei. The sixth transistor T6 may be connected between the third node N3 and the light emitting element LD (or a fourth node N4). A gate electrode of the sixth transistor T6 may be connected to the ith emission control line Ei. The fifth transistor T5 and the sixth transistor T6 may be turned off when an emission control signal EM[i] (e.g., the emission control signal EM[i] having a high level) is supplied to the ith emission control line Ei, and be turned on in other cases.

The seventh transistor T7 may be connected between the first electrode of the light emitting element LD (i.e., the fourth node N4) and a third power line PL3. A gate electrode of the seventh transistor T7 may be connected to a 3ith scan line S3i. A second initialization power voltage Vint2 may be provided to the third power line PL3. In some embodiments, the second initialization power voltage Vint2 may be equal to or different from the first initialization power voltage Vint1. The seventh transistor T7 may be turned on by a third scan signal GB[i] supplied to the 3ith scan line S3i, to supply the second initialization power voltage Vint2 to the first electrode of the light emitting element LD.

The storage capacitor Cst may be connected or formed between the first power line PL1 and the first node N1.

The boost capacitor Cbst may be connected or formed between the gate electrode of the second transistor T2 and the gate electrode of the first transistor T1.

The photo sensor PHSik may include a sensor circuit SCa and a light receiving element LRD. The sensor circuit SCa may include first, second, and third transistors M1, M2, and M3. The first and third transistors M1 and M3 may be connected in series between a second power line PL12 and the kth readout line RXk (k is a natural number).

The first transistor M1 (or first sensor transistor) may be connected between the second power line PL12 (or fourth power line) and the third transistor M3. A gate electrode of the first transistor M1 may be connected to a first node N11 (or sensor node). The first transistor M1 may control a current flowing from the second power line PL12 to the kth readout line RXk through the third transistor M3 in response to a voltage of the first node N11. A common voltage VCOM may be provided to the second power line PL12.

In some embodiments, the second power line PL12 may be electrically connected to or integrally formed with the third power line PL3, and the common voltage VCOM applied to the second power line PL12 may be equal to the second initialization power voltage Vint2. However, the present disclosure is not limited thereto. For example, the second power line PL12 may be electrically connected to or integrally formed with the second power line PL2, and the common voltage VCOM applied to the second power line PL12 may be equal to the first initialization power voltage Vint1.

The third transistor M3 (second sensor transistor or switching transistor) may be connected between the first transistor M1 and the kth readout line RXk. A gate electrode of the third transistor M3 may be connected to a sensing scan line SSi.

The second transistor M2 (or third sensor transistor) may be connected between a first power line PL11 (or third power line) and the first node N11. A gate electrode of the second transistor M2 may be connected to a reset control line RSTL. A reset voltage VRST may be provided to the first power line PL11.

At least one light receiving element LRD may be connected between the first node N11 and the electrode EP to which the second power voltage VSS is provided.

The light receiving element LRD may generate charges (or current), based on incident light. That is, the light receiving element LRD may perform a photoelectric transformation function. For example, the light receiving element LRD may be implemented as a photo diode.

When the second transistor M2 is turned on by a reset signal RST supplied to the reset control line RSTL, the reset voltage VRST may be provided to the first node N11. For example, the voltage of the first node N11 may be reset by the reset voltage VRST. The light receiving element LRD may perform the photoelectric transformation function after the reset voltage VRST is applied to the first node N11.

The voltage of the first node N11 may be changed by an operation of the light receiving element LRD. The voltage of the first node N11 (or charges or current, generated in the light receiving element LRD) may be changed according to an intensity of light incident onto the light receiving element LRD and a time during which the light is incident (or a time during which the light receiving element LRD is exposed by the light).

When the third transistor M3 is turned on by a sensing scan signal SCAN[i] supplied to the sensing scan line SSi, a detection value (current and/or voltage) generated based on the voltage of the first node N11 may flow in the kth readout line RXk.

In an embodiment, each of the pixel circuit PXC and the sensor circuit SCa include a P-type transistor and an N-type transistor. In an embodiment, the third transistor T3, the fourth transistor T4, the second transistor M2, and the third transistor M3 are formed with an oxide semiconductor transistor including an oxide semiconductor. For example, the third transistor T3, the fourth transistor T4, the second transistor M2, and the third transistor M3 may be implemented with an N-type oxide semiconductor transistor, and include an oxide semiconductor layer as an active layer.

The oxide semiconductor transistor may be formed through a low temperature process, and have a charge mobility lower than a charge mobility of the poly-silicon semiconductor transistor. That is, the oxide semiconductor transistor has an excellent off-current characteristic. Thus, leakage current in the third transistor T3, the fourth transistor T4, the second transistor M2, and the third transistor M3 can be minimized.

The other transistors T1, T2, T5, T6, T7, and M1 may be formed with a poly-silicon semiconductor transistor including a silicon semiconductor, and include a poly-silicon semiconductor layer as an active layer. For example, the active layer may be formed through a low temperature poly-silicon (LTPS) process. For example, the poly-silicon transistor may be a P-type poly-silicon transistor. Since the poly-silicon semiconductor transistor has a high response speed, the poly-silicon semiconductor transistor may be applied to a switching element which requires fast switching.

When the third transistor M3 is implemented as an oxide semiconductor transistor, current leaked through the kth readout line RXk can be minimized. Thus, the sensing sensitivity of the photo sensor PHS including the sensor circuit SCa can be increased.

FIG. 5 is a waveform diagram illustrating an embodiment of operations of the pixel and the photo sensor, which are shown in FIG. 4.

Referring to FIGS. 4 and 5, the emission control signal EM[i] may be provided to the ith emission control line Ei, the second scan signal GI[i] may be provided to the 2ith scan line S2$i$, the fourth scan signal GC[i] may be provided to the 4ith scan line S4$i$, the third scan signal GB[i] may be provided to the 3ith scan line S3$i$, and the first scan signal GW[i] may be provided to the 1ith scan line S1$i$. The reset signal RST may be provided to the reset control line RSTL. The sensing scan signal SCAN[i] may be provided to the sensing scan line SSi.

The sensing scan signal SCAN[i] (or ith sensing scan signal) may mean a signal provided to the gate electrode of the third transistor M3. When the sensing scan signal SCAN[i] is supplied, a detection value may be supplied to the readout line RXk. That is, when the sensing scan signal SCAN[i] is supplied, a fingerprint of a user and a touch input may be detected. To this end, the sensing scan signal SCAN[i] may be supplied at least once during one frame period.

A kth frame period FRAME_k may include a non-emission period P_NE, and the non-emission period P_NE (or the kth frame period FRAME_k) may include an initialization period P_INT, a compensation period P_C, and a writing period P_W. The writing period P_W may be included in the compensation period P_C. For example, the writing period P_W may correspond to 1 horizontal time, each of the initialization period P_INT and the compensation period P_C may correspond to 6 horizontal times, and the non-emission period P_NE may correspond to 26 horizontal times. However, the present disclosure is not limited thereto.

In the non-emission period P_NE, the emission control signal EM[i] may have a high level. The fifth transistor T5 and the sixth transistor T6 may be turned off in response to the emission control signal EM[i] having the high level, and the pixel PXij does not emit light.

In the initialization period P_INT, the second scan signal GI[i] may have the high level. The fourth transistor T3 may be turned on in response to the second scan signal GI[i] having the high level, and the first initialization power voltage Vint of the second power line PL2 may be provided to the first node N1 (or the gate electrode of the first transistor T1).

After that, the fourth scan signal GC[i] may have the high level during the compensation period P_C. The third transistor T3 may be turned on in response to the fourth scan signal GC[i] having the high level, and the first transistor T1 becomes diode-connected.

In the writing period P_W, the first signal GW[i] may have a low level. The second transistor T2 may be turned on in response to the first signal GW[i] having the low level, and a data signal may be provided to the second node N2 from the jth data line Dj. In addition, since the third transistor T3 is in the turn-on state in response to the fourth scan signal GC[i] having the high level, the data signal may be transferred to the first node N1 through the first transistor T1 and the third transistor T3 from the second node N2. Since the first transistor T1 is maintained in a diode-connected state by the turned-on third transistor T3, the first node N1 may have a voltage obtained by compensating a threshold voltage of the first transistor in the data signal.

Before the writing period P_W, the third scan signal GB[i] may have the low level. The seventh transistor T7 may be turned on in response to the third scan signal GB[i] having the low level, and the second initialization power voltage Vint2 may be supplied to the first electrode of the light emitting element LD. The third scan signal GB[i] may be a first scan signal (e.g., GW[i−1]) provided to a previous row, but the present disclosure is not limited thereto.

After that, the non-emission period P_NE may end, and the emission control signal EM[i] may have the low level. The fifth transistor T5 and the sixth transistor T6 may be turned on in response to the emission control signal EM[i] having the low level, and a current flowing path may be formed from the first power line PL1 to the electrode EP through the fifth transistor T5, the first transistor T1, the sixth transistor T6, and the light emitting element LD. A driving current corresponding to the voltage (e.g., the data signal) of the first node N1 may flow through the light emitting element LD according to an operation of the first transistor T1, and the light emitting element LD may emit light with a luminance corresponding to the driving current.

Meanwhile, the reset signal RST may have the high level in a reset period P_RST before the kth frame period FRAME_k. The reset circuit 2141 may provide the reset signal RST having the high level to the reset control line RSTL. The second transistor M2 may be turned on in response to the reset signal RST having the high level, and the reset voltage VRST may be applied to the first node N11. The voltage of the first node N11 may be reset by the reset voltage VRST.

After that, the second transistor M2 may be turned off in response to the reset signal RST having the low level. When light is incident onto the light receiving element LRD during an exposure time EIT, the voltage of the first node N11 may be changed by the photoelectric transformation function of the light receiving element LRD.

The sensing scan signal SCAN[i] may have the high level in a sensing scan period P_SC of the kth frame period FRAME_k. In FIG. 5, it is illustrated that the sensing scan period P_SC is the same period as the initialization period P_INT. However, embodiments are not limited thereto, and the position of the sensing scan period P_SC may be variously set.

The third transistor M3 may be turned on in response to the sensing scan signal SCAN[i], and a current (or detection value) may flow from the second power line PL12 to the kth readout line RXk, corresponding to the voltage of the first node N11.

For example, when a touch input of a user occurs in the pixel unit 112, a current, i.e., a detection value corresponding to light reflected by the user (e.g., a finger of the user) may be output in the kth frame period FRAME_k. For example, a fingerprint of the user may be sensed based on the detection value. For example, a touch input of the user may be sensed based on the detection value.

Figure 6A:
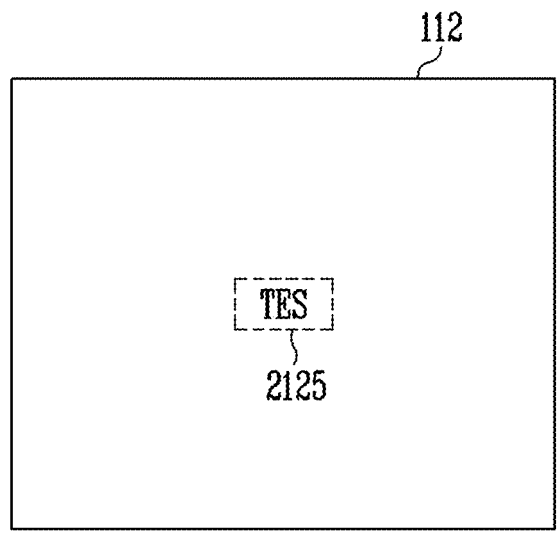
FIGS. 6A and 6B are diagrams illustrating a position of a temperature sensor in accordance with an embodiment of the present disclosure.
Figure 6B:
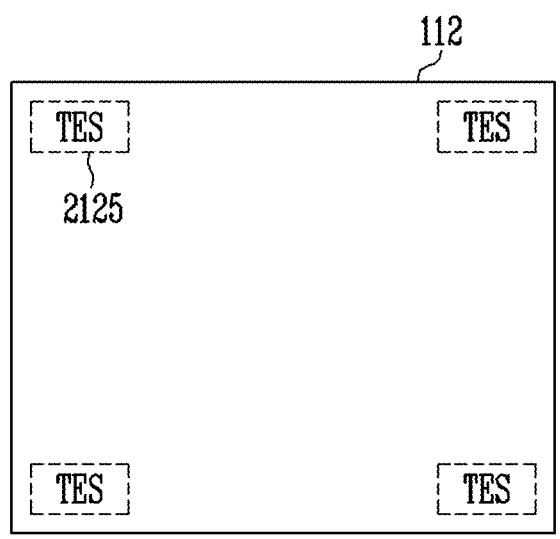

FIGS. 6A and 6B are diagrams illustrating a position of the temperature sensor in accordance with an embodiment of the present disclosure.

Referring to FIG. 6A, the temperature sensor 2125 is disposed to overlap with the pixel unit 112. In an example, the temperature sensor 2125 may be located at a central portion of the pixel unit 112, and supply, to the controller 2123, temperature information corresponding to a temperature of the central portion of the pixel unit 112. In an embodiment, the controller 2123 calculates a total temperature of the pixel unit 112, based on the temperature of the central portion of the pixel unit 112.

Referring to FIG. 6B, at least two temperature sensors 2125 are disposed at an outer portion of the pixel unit 112. In an example, the temperature sensor 2125 may be disposed at each corner of the pixel unit 112, and supply, to the controller 2123, temperature information corresponding to a temperature of each corner of the pixel unit 112. In an embodiment, the controller 2123 calculates (e.g., an average) a total temperature of the pixel unit 112, based on the temperature of each corner of the pixel unit 112.

However, embodiments of the present disclosure is not limited thereto, and the temperature sensor 2125 may be disposed at various positions to overlap with the pixel unit 112. The controller 2123 may determine a total temperature of the pixel unit 112 or a temperature for each block, corresponding to the temperature information from the temperature sensor 2125.

Figures 7, 8:
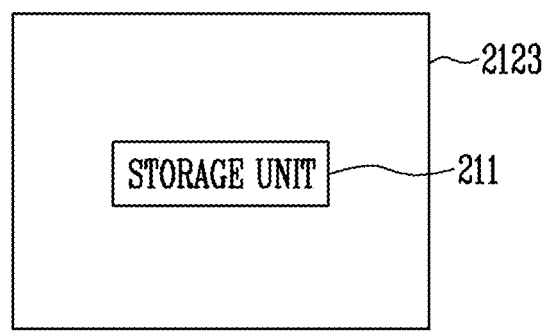
FIG. 7 is a diagram illustrating a controller in accordance with an embodiment of the present disclosure.
FIG. 8 is a diagram illustrating voltage information stored in a storage unit shown in FIG. 7.

FIG. 7 is a diagram illustrating a controller in accordance with an embodiment of the present disclosure. FIG. 8 is a diagram illustrating voltage information stored in a storage unit shown in FIG. 7. FIG. 9 is a diagram illustrating a voltage difference corresponding to the voltage information shown in FIG. 8.

Referring to FIGS. 7 to 9, the controller 2123 may include a storage unit 211. Voltage information of a second power voltage VSS and a reset voltage VRST, corresponding to temperature information of the pixel unit 112, may be stored in the storage unit 211.

In an embodiment, the second power voltage VSS may be set to a voltage value of a reference second power voltage RVSS at a reference temperature (e.g., 25° C.). Also, the second power voltage VSS may be set to have voltages (e.g., VSS21, VSS22) which are gradually increased as compared with the reference second power voltage RVSS as the temperature increases from the reference temperature.

In an example, when the temperature of the pixel unit 112 is 35° C., the second power voltage VSS may be set to voltage VSS21, and the voltage VSS21 is a voltage higher than the reference second power voltage RVSS. In an example, when the temperature of the pixel unit 112 is 45° C., the second power voltage VSS may be set to voltage VSS22, and the voltage VSS22 is a voltage higher than the voltage VSS21.

In an embodiment, the second power voltage VSS may be set to have voltages (e.g., VSS11, VSS12, VSS13, VSS14, VSS15, VSS16) gradually decreased as compared with the reference second power voltage RVSS as the temperature decreases from the reference temperature. In an example, when the temperature of the pixel unit 112 is 10° C., the second power voltage VSS may be set to voltage VSS11, and the voltage VSS11 is a voltage lower than the reference second power voltage RVSS. Similarly, as the temperature of the pixel unit 112 decreases, the second power voltage VSS may be gradually decreased to voltages VSS12, VSS13, VSS14, VSS15, and VSS16.

The second power voltage VSS may be set in advance to voltage corresponding to a characteristic of the light emitting element LD, which corresponds to the temperature. In an example, the second power voltage VSS may be set in advance such that a certain current or a current similar thereto can flow through the light emitting element LD regardless of the temperature.

In an embodiment, the reset voltage VRST is set to a voltage value of a reference reset voltage RVRST at the reference temperature (e.g., 25° C.). In an example, the reset voltage VRST may be set as voltages VRST21 and VRST22 at the reference temperature or higher.

The reset voltage VRST may be set such that a voltage difference between the reset voltage VRST and the second power voltage VSS is decreased as the temperature increases from the reference temperature. In an example, as shown in FIG. 9, the voltage difference between the second power voltage VSS (or RVSS) and the reset voltage VRST (or RVRST) at the reference temperature may be set to a second voltage V2. In addition, the voltage difference between the second power voltage VSS (or RVSS) and the reset voltage VRST (or RVRST) at a temperature (e.g., 45° C.) higher than the reference temperature may be set to a first voltage V1. The first voltage V1 may be lower than the second voltage V2.

That is, in an embodiment of the present disclosure, when the temperature of the pixel unit 112 increases, the voltage difference between the reset voltage VRST and the second power voltage VSS may be set low (or small).

More specifically, when the temperature of the pixel unit 112 increases, an amount of current flowing through the light receiving element LRD may be increased corresponding to the same condition (e.g., an intensity of light or a light exposure time). In an embodiment of the present disclosure, the voltage difference between the reset voltage VRST and the second power voltage VSS may be set low, corresponding to an increase in the temperature of the pixel unit 112. That is, in an embodiment of the present disclosure, the voltage difference between the reset voltage VRST and the second power voltage VSS is controlled corresponding to the temperature of the pixel unit 112, so that a current variation corresponding to a characteristic change of the light receiving element LRD can be compensated.

In an embodiment, the reset voltage VRST is set such that the voltage difference between the reset voltage VRST and the second power source VSS is increased as the temperature decreases from the reference temperature. In an embodiment, the reset voltage VRST may be set to a voltage value of the reference reset voltage RVRST at the reference temperature (e.g., 25° C.). In an example, the reset voltage VRST may be set as voltages VRST11, VRST12, VRST13, VRST14, VRST15, and VRST16 at the reference temperature or lower.

The reset voltage VRST may be set such that the voltage difference between the reset voltage VRST and the second power source VSS becomes higher (or larger) as the temperature decreases from the reference temperature. In an example, as shown in FIG. 9, the voltage difference between the second power voltage VSS (or RVSS) and the reset voltage VRST (or RVRST) at the reference temperature may be set to the second voltage V2. In addition, the voltage difference between the second power voltage VSS (or VSS16) and the reset voltage VRST (or VRST16) at a temperature (e.g., −40° C.) lower than the reference temperature may be set to a third voltage V3. In an embodiment, the third voltage V3 is higher than the second voltage V2.

That is, in an embodiment of the present disclosure, when the temperature of the pixel unit 112 decreases, the voltage difference between the reset voltage VRST and the second power voltage VSS may be set high. More specifically, when the temperature of the pixel unit 112 decreases, an amount of current flowing through the light receiving element LRD may be decreased corresponding to the same condition (e.g., an intensity of light or a light exposure time). In an embodiment of the present disclosure, the voltage difference between the reset voltage VRST and the second power voltage VSS may be set large, corresponding to a decrease in the temperature of the pixel unit 112. That is, in an embodiment of the present disclosure, the voltage difference between the reset voltage VRST and the second power voltage VSS is changed based on the temperature of the pixel unit 112, so that a current variation corresponding to a characteristic change of the light receiving element LRD can be compensated.

An operation process will be briefly described. When a predetermined image is displayed on the pixel unit 112, the temperature sensor 2125 may sense a temperature of the pixel unit 112, and supply temperature information based on the sensed temperature to the controller 2123. The controller 2123 may extract voltage information corresponding to the temperature of the pixel unit 122, using a lookup table shown in FIG. 8, which is stored in the storage unit 211, corresponding to the temperature information of the pixel unit 211. In an example, the controller 2123 may extract voltage information of the reference second power voltage RVSS and the reference reset voltage RVRST when the temperature of the pixel unit 112 is the reference temperature (e.g., 25° C.).

After that, the controller 2123 may supply, to the power supply 2124, the voltage information of the reference second power voltage RVSS and the reference reset voltage RVRST. Then, the power supply 2124 may generate the reference second power voltage RVSS as the second power voltage VSS and the reference reset voltage RVRST as the reset voltage VRST, and supply the reference second power voltage RVSS and the reference reset voltage RVRST to the pixel unit 112. That is, in an embodiment of the present disclosure, the reset voltage VRST is set by considering a temperature characteristic of the pixel unit 112, and accordingly, the reliability of operations of the photo sensors PHS can be ensured. The temperatures and voltages, which are included in the lookup table shown in FIG. 8, are merely illustrative for describing the present disclosure, and various temperature information may be included in an actual lookup table.

FIG. 10 is a diagram illustrating an embodiment of the lookup table stored in the storage unit shown in FIG. 7. FIG. 11 is a diagram illustrating a voltage of a reset signal shown in FIG. 10. In FIG. 10, descriptions of portions overlapping with those shown in FIG. 8 will be omitted.

Referring to FIG. 10, a voltage of the reset signal RST, which corresponds to temperature, may be further stored. The voltage of the reset signal RST may mean a gate-on voltage (or high level voltage) at which the second transistor M2 can be turned on.

In an embodiment, the voltage of the reset signal RST may be set as a reference reset signal voltage RRST at a reference temperature (e.g., 25° C.). Also, the voltage of the reset signal RST may be set to have voltages (e.g., RST21, RST22) gradually decreased as compared with the reference reset signal voltage RRST as the temperature increases from the reference temperature.

In an example, when the temperature of the pixel unit 112 is 35° C., the voltage of the reset signal RST may be set as voltage RST21, and the RST21 may be set as a voltage lower than the reference reset signal voltage RRST. In an example, when the temperature of the pixel unit 112 is 45° C., the voltage of the reset signal RST may be set as voltage RST22 that is lower than the voltage RST21.

In an embodiment, the voltage of the reset signal RST may be set to have voltages (e.g., RST11, RST12, RST13, RST14, RST15, RST16) gradually increased as compared with the reference reset signal voltage RRST as the temperature decreases from the reference temperature. In an example, when the temperature of the pixel unit 112 is 10° C., the voltage of the reset signal RST may be set as voltage RST11 that is higher than the reference reset signal voltage RRST. Similarly, the voltage of the reset signal RST may be gradually increased to voltages RST12, RST13, RST14, RST15, and RST16 as the temperature of the pixel unit 112 deceases.

When the voltage of the reset signal RST is decreased, a voltage Vgs of the second transistor M2 may be set low. Also, when the voltage of the reset signal RST is increased, the voltage Vgs of the second transistor M2 may be set high. In an example, in an embodiment of the present disclosure, the voltage Vgs of the second transistor M2 may be set low when the temperature of the pixel unit 112 increases, and accordingly, the amount of current flowing through the light receiving element LRD may be decreased. In an example, in an embodiment of the present disclosure, the voltage Vgs of the second transistor M2 may be set high when the temperature of the pixel unit 112 decreases, and accordingly, the amount of current flowing through the light receiving element LRD may be increased.

In an example, as shown in FIG. 11, the voltage of the reset signal RST at the reference temperature may be set as a second voltage V12. The voltage of the reset signal RST at a temperature higher than the reference temperature may be set as a first voltage V11 lower than the second voltage V12. Also, the voltage of the reset signal RST at a temperature lower than the reference temperature may be set as a third voltage V13 higher than the second voltage V12.

An operation process will be briefly described. When a predetermined image is displayed on the pixel unit 112, the temperature sensor 2125 may sense a temperature of the pixel unit 112, and supply temperature information based on or including the sensed temperature to the controller 2123. The controller 2123 may extract voltage information corresponding to the temperature of the pixel unit 122, using the lookup table shown in FIG. 10, which is stored in the storage unit 211, corresponding to the temperature information of the pixel unit 211. In an example, the controller 2123 may extract voltage information of the reference second power voltage RVSS, the reference reset voltage RVRST, and the reference reset signal voltage RRST when the temperature of the pixel unit 112 is the reference temperature (e.g., 25° C.).

After that, the controller 2123 may supply, to the power supply 2124, the voltage information of the reference second power voltage RVSS, the reference reset voltage RVRST, and the reference reset signal voltage RRST. Then, the power supply 2124 may generate the reference second power voltage RVSS as the second power voltage VSS and the reference reset voltage RVRST as the reset voltage VRST, and supply the reference second power voltage RVSS and the reference reset voltage RVRST to the pixel unit 112. Also, the power supply 2124 may supply, to the reset circuit 2141, a gate-on voltage VGON corresponding to the reference reset signal voltage RRST (e.g., the second voltage V12). The reset circuit 2141 may supply, to the pixel unit 112, a reset signal RST corresponding to the gate-on voltage VGON.

Figure 12:
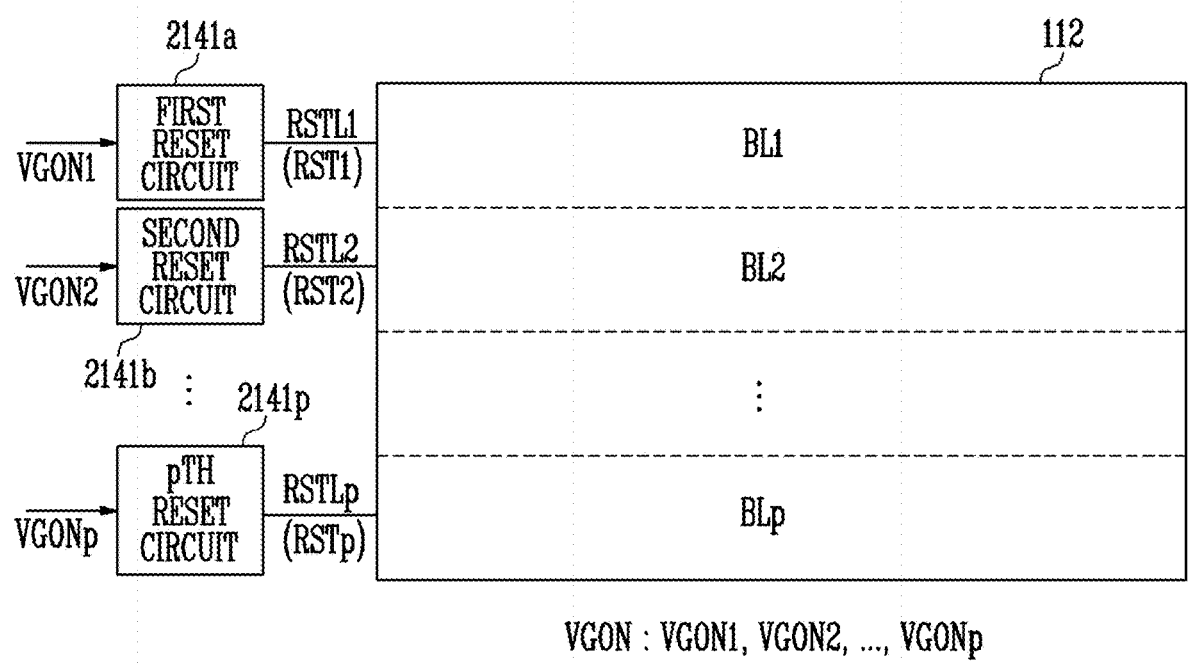
FIG. 12 is a diagram illustrating a pixel unit in accordance with an embodiment of the present disclosure.

FIG. 12 is a diagram illustrating a pixel unit in accordance with an embodiment of the present disclosure.

Referring to FIG. 12, in an embodiment of the present disclosure, the pixel unit 112 may include a plurality of blocks BL1, BL2, . . . , BLp (p is a natural number of 3 or more). The plurality of blocks BL1 to BLp may be divided in units of horizontal lines. The plurality of blocks BL1 to BLp may include at least one photo sensor PHS.

Photo sensors PHS included in the respective blocks BL1 to BLp may be electrically connected to different reset control lines RSTL1, RSTL2, . . . , RSTLp. In an example, photo sensors PHS included in a first block BL1 may be electrically connected to a first reset control line RSTL1. In an example, photo sensors PHS included in a second block BL2 may be electrically connected to a second reset control line RSTL2. In an example, photo sensors PHS included in a pth block BLp may be electrically connected to a pth reset control line RSTLp.

The first reset control line RSTL1 may be supplied with a first reset signal RST1 from a first reset circuit 2141a. The first reset circuit 2141a may generate the first reset signal RST1, using a first gate-on voltage VGON1 supplied from the power supply 2124, and supply the generated first reset signal RST1 to the first reset control line RSTL1. A voltage value of the first gate-on voltage VGON1 may be set based on a temperature of the first block BL1.

The second reset control line RSTL2 may be supplied with a second reset signal RST2 from a second reset circuit 2141b. The second reset circuit 2141b may generate the second reset signal RST2, using a second gate-on voltage VGON2 supplied from the power supply 2124, and supply the generated second reset signal RST2 to the second reset control line RSTL2. A voltage value of the second gate-on voltage VGON2 may be set based on a temperature of the second block BL2.

The pth reset control line RSTLp may be supplied with a pth reset signal RSTp from a pth reset circuit 2141p. The pth reset circuit 2141p may generate the pth reset signal RSTp, using a pth gate-on voltage VGONp supplied from the power supply 2124, and supply the generated pth reset signal RSTp to the pth reset control line RSTLp. A voltage value of the pth gate-on voltage VGONp may be set corresponding to a temperature of the pth block BLp.

In an embodiment, the controller 2123 determines a total temperature of the pixel unit 112 by using (or averaging) temperatures of the respective blocks BL1 to BLp, which are supplied by the temperature sensor 2125, and extract voltage values of the second power voltage VSS and the reset voltage VRST, using the lookup table shown in FIG. 8 or 10, corresponding to the temperature of the pixel unit 112. Voltage information of the second power voltage VSS and the reset voltage VRST may be supplied to the power supply 2124, and the power supply 2124 may generate a second power voltage VSS and a reset voltage RST, which correspond to the voltage information, and then supply the second power voltage VSS and the reset voltage RST to the photo sensors PHS included in the pixel unit 112.

In an embodiment, the controller 2124 is supplied with a temperature for each of the blocks BL1 to BLp from the temperature sensor 2125, and extracts a voltage value of a reset signal RST corresponding to the temperature for each of the blocks BL1 to BLp, using the lookup table shown in FIG. 10. Voltage information of the reset signal RST for each of the blocks BL1 to BLp may be supplied to the power supply 2124, and the power supply 2124 may supply gate-on voltages VGON1 to VGONp corresponding to the voltage information of the reset signal RST respectively to the reset circuits 2141a to 2141p.

That is, in the embodiment of the present disclosure, the second power voltage VSS and the voltage of the reset signal RST are controlled, so that a temperature characteristic of the light receiving element LRD included in each of the photo sensors PHS can be compensated. In addition, the voltage of the reset signal RST may be controlled in units of the blocks BL1 to BLp, so that a temperature variation corresponding to the position of the pixel unit 112 can be compensated (or the temperature characteristic of the light receiving element LRD can be compensated).

Figure 13:
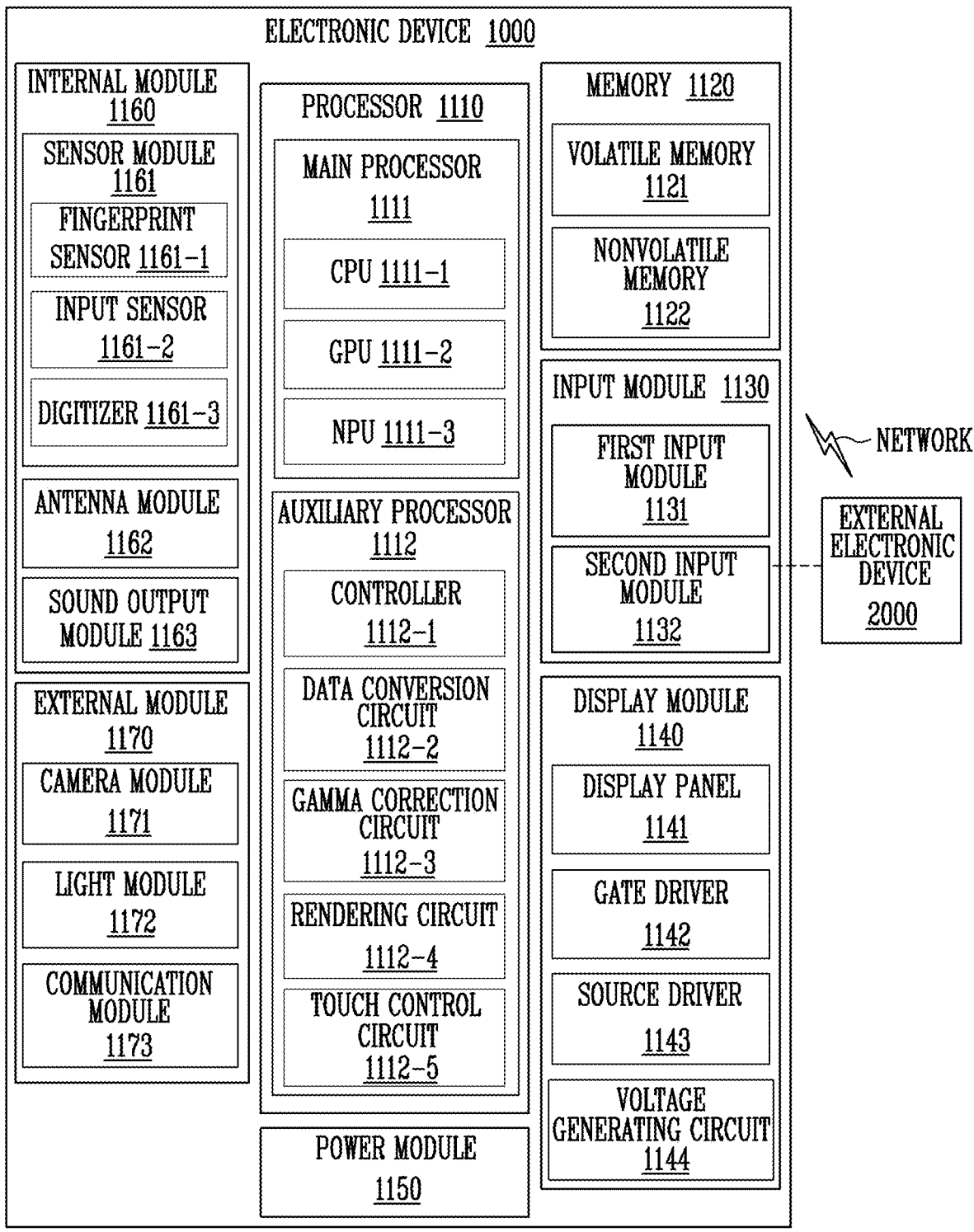
FIG. 13 is a diagram illustrating an electronic device in accordance with an embodiment of the present disclosure.

FIG. 13 is a diagram illustrating an electronic device in accordance with an embodiment of the present disclosure.

Referring to FIG. 13, the electronic device 1000 in accordance with the embodiment of the present disclosure may output various information through a display module 1140. When the processor 1110 executes an application stored in a memory 1120, the display module 1140 may provide application information to a user through a display panel 1141.

The processor 1110 may acquire an external input through an input module 1130 or a sensor module 1161, and execute an application corresponding to the external input. For example, when the user selects a camera icon (or camera application icon) displayed on the display panel 1141, the processor 1110 may acquire a user input through an input sensor 1161-2, and activate a camera module 1171. The processor 1110 may transfer, to the display module 1140, image data corresponding to a photographed image acquired through the camera module 1171. The display module 1140 may display an image corresponding to the photographed image through the display panel 1141.

In another example, when personal information authentication is executed in the display module 1140, a fingerprint sensor 1161-1 may acquire input fingerprint information as input data. The processor 1110 may compare the input data acquired through the fingerprint sensor 1161-1 with authentication data stored in the memory 1120, and execute an application according to a comparison result. The display module 1140 may display information executed according to a logic of the application through the display panel 1141. The fingerprint sensor 1161-1 may be disposed to acquire fingerprint information in the entire area of the display panel 1141.

In still another example, when a music streaming icon displayed on the display module 1140 is selected, the processor 1110 may acquire a user input through the input sensor 1161-2, and active a music streaming application stored in the memory 1120. When a music play command is input in the music streaming application, the processor 1110 may activate a sound output module 1163, thereby providing the user with sound information which accords with the music play command.

In the above, operations of the electronic device 1000 have been briefly described. Hereinafter, components of the electronic device 1000 will be described in detail. Some of the components of the electronic device 1000, which will be described later, may be integrated to be provided as one component, and one component may be separated into two or more components to be provided.

The electronic device 1000 may communicate with an external electronic device 2000 through a network (e.g., a short-range wireless communication network or a long-range wireless communication network). In accordance with an embodiment, the electronic device 1000 may include the processor 1110, the memory 1120, the input module 1130, the display module 1140, a power module 1150, an internal module 1160, and an external module 1170. In accordance with an embodiment, in the electronic device 1000, at least one of the above-described components may be omitted, or one or more other components may be added. In accordance with an embodiment, some components (e.g., the sensor module 1161, an antenna module 1162, and/or the sound output module 1163) among the above-described components may be integrated in another component (e.g., the display module 1140).

The processor 1110 may control at least another component (e.g., a hardware or software component) of the electronic device 1000, which is connected to the processor 1110, by executing software, and perform various processing or calculations. In accordance with an embodiment, as at least a portion of the data processing and calculations, the processor 1110 may store, in a volatile memory 1121, a command or data, received from another component (e.g., the input module 1130, the sensor module 1161, or a communication module 1173), process the command or data, stored in the volatile memory 1121, and store result data in a nonvolatile memory 1122.

The processor 1110 may include a main processor 1111 and an auxiliary processor 1112. The main processor 1111 may include a central processing unit (CPU) 1111-1 (or the application processor (AP) 30 shown in FIG. 1). The main processor 1111 may further include at least one of a graphic processing unit (GPU) 1111-2, a communication processor (CP), and an image signal processor (ISP). The main processor 1111 may further include a neural processing unit (NPU) 1111-3. The NPU 1111-3 is a processor specified for processing an artificial intelligence (AI) model, and the AI model may be generated through machine learning. The AI model may include a plurality of artificial neural network layers. An artificial neural network may be a deep neural network (DNN), a convolutional neural network (CNN), a recurrent neural network (RNN), a restricted boltzman machine (RBM), a deep belief network (DBN), a bidirectional recurrent deep neural network (BRDNN), a deep Q-networks, or one of two or more combinations thereof, but the present disclosure is not limited to the above-described example. The AI model may additionally or alternatively include a software structure, in addition to a hardware structure. At least two of the above-described processing units and the above-described processors may be implemented into one integrated component (e.g., a single chip), or be implemented as components (e.g., a plurality of chips) independent from each other.

The auxiliary processor 1112 may include a controller 1112-1. The controller 1112-1 may include an interface conversion circuit and a timing control circuit. In an example, the controller 1112-1 may include the controller 2123 shown in FIG. 3. The controller 1112-1 may receive an image signal from the main processor 1111, and convert a data format of the image signal to be suitable for interface specifications with the display module 1140, thereby outputting image data. The controller 1112-1 may output various control signals necessary for driving of the display module 1140.

The auxiliary processor 1112 may further include a data conversion circuit 1112-2, a gamma correction circuit 1112-3, a rendering circuit 1112-4, a touch control circuit 1112-6, and the like. The data conversion circuit 1112-2 may receive image data from the controller 1112-1, and compensate for the image data such that an image is displayed with a desired luminance according to a characteristic of the electronic device 1000 or a setting of the user or convert the image data for the purpose of reduction of power consumption, after-image compensation, or the like.

The gamma correction circuit 1112-3 may convert image data, a gamma reference voltage, or the like such that an image displayed in the electronic device 1000 has a desired gamma characteristic. The rendering circuit 1112-4 may receive image data from the controller 1112-1, and render the image data by considering a pixel arrangement of the display panel 1141, and the like, applied to the electronic device 1000.

The touch control circuit 1112-5 may supply a touch signal to the input sensor 1161-2, and be supplied with a sensing signal from the input sensor 1161-2, corresponding to the touch signal. The touch control circuit 1112-5 may include the touch sensor driver 220 shown in FIG. 1.

At least one of the data conversion circuit 1112-2, the gamma correction circuit 1112-3, the rendering circuit 1112-4, and the touch control circuit 1112-5 may be integrated in another component (e.g., the main processor 1111 or the controller 1112-4). At least one of the data conversion circuit 1112-2, the gamma correction circuit 1112-3, and the rendering circuit 1112-4 may be integrated into a source driver 1143 which will be described later.

The memory 1120 may store various data used by at least one component (e.g., the processor 1110 or the sensor module 1161) of the electronic device 1000 and input or output data about a command associated therewith. Also, various setting data corresponding to the setting of the user the memory 1120. The memory 1120 may include at least one of the volatile memory 1121 and the nonvolatile memory 1122.

The input module 1130 may receive a command or data to be used in a component (e.g., the processor 1110, the sensor module 1161, or the sound output module 1163) of the electronic device 1000 from the outside (e.g., the user or the external electronic device 2000) of the electronic device 1000.

The input module 1130 may include a first input module 1131 to which a command or data is input from the user and a second input module 1132 to which a command or data is input from the external electronic device 2000. The first input module 1131 may include a microphone, a mouse, a keyboard, a key (e.g., a button), or a pen (e.g., a passive pen or an active pen). The second input module 1132 may support a specified protocol capable of enabling the electronic device 1000 to communicate with the external electronic device 2000 in a wired manner or wirelessly. In accordance with an embodiment, the second input module 1132 may include a high definition multimedia interface (HDMI), a universal serial bus (USB) interface, an SD card interface, or an audio interface. The second input module 1132 may include a connector, e.g., an HDMI connector, a USB connector, an SD card connector, or an audio connector (e.g., a headphone connector), which can physically connect the electronic device 1000 to the external electronic device 2000.

The display module 1140 may visually provide information to the user. The display module 1140 may include the driving circuit 210 shown in FIG. 1. The display module 1140 may include the display panel 1141, a gate driver 1142, and the source driver 1143. The display module 1140 may further include a window for protecting the display panel 1141, a chassis, and a bracket. The display module 1140 may include the display device 1 shown in FIG. 1.

The display panel 1141 (or display) may include a liquid crystal display panel, an organic light emitting display panel, or an inorganic light emitting display panel, and the kind of the display panel 1141 is not particularly limited. The display panel 1141 may be of a rigid type or a flexible type in which the display panel 1141 is rollable or foldable. The display module 1140 may further include a supporter for supporting the display panel 1141, a bracket, a heat dissipation member, or the like. The display panel 1141 may include the panel 10 shown in FIG. 1.

The gate driver 1142 may be a driving chip, and may be mounted in the display panel 1141. Also, the gate driver 1142 may be integrated in the display panel 1141. For example, the gate driver 1142 may include an Amorphous Silicon TFT Gate (ASG) driver circuit, a Low Temperature Polycrystalline Silicon (LTPS) TFT gate driver circuit, or an Oxide Semiconductor TFT Gate (OSG) driver circuit, which is embedded in the display panel 1141. The gate driver 1142 may receive a control signal from the controller 1112-1, and output scan signals to the display panel 1141 in response to the control signal. The gate driver 1142 may include the scan driver 2121 and the sensing scan driver 2143, which are shown in FIG. 3.

The display module 1140 may further include an emission driver. The emission driver may output an emission control signal to the display panel 1141 in response to a control signal receive from the controller 1112-1. The emission driver may be formed separately from the gate driver 1142, or be integrated in the gate driver 1142.

The source driver 1143 may receive a control signal from the controller 1112-1, and convert image data into an analog voltage (e.g., a data voltage) and then output data voltages to the display panel 1141 in response to the control signal. The source driver 1143 may include the data driver 2122 shown in FIG. 3.

The source driver 1143 may be integrated in another component (e.g., the controller 1112-1). Functions of the interface conversion circuit and the timing control circuit of the controller 1112-1, which are described above, may be integrated in the source driver 1143. Additionally, the display module 1140 may further include the reset circuit 2141 and the readout circuit 2142, which are shown in FIG. 3.

The display module 1140 may further include a voltage generating circuit 1144. The voltage generating circuit 1144 may output various voltages for driving the display panel 1141. In an example, the voltage generating circuit 1144 may include the power supply 2124 shown in FIG. 3.

In an embodiment, the display panel 1141 may include the plurality of pixels PX and the plurality of photo sensors PHS, which are shown in FIG. 1.

In an embodiment, the source driver 1143 may convert data corresponding to red (R), green (G), and blue (B), included in image data received from the processor 1110, into a red data signal (or data voltage), a green data signal, and a blue data signal, and provide the red data signal, the green data signal, and the blue data signal to a plurality of pixel columns included in the display panel 1141 during one horizontal period.

The power module 1150 may supply power to at least one component of the electronic device 1000. The power module 1150 may include a battery for charging a power voltage. The battery may include a primary cell which is not rechargeable, a secondary cell which is rechargeable, or a fuel cell. The power module 1150 may include a power management integrated circuit (PMIC). The PMIC may supply an optimized power source to each of the above-described modules and modules which will be described later. The power module 1150 may include a wireless power transmission/reception member electrically connected to the battery. The wireless power transmission/reception member may include a plurality of coil-shaped antenna radiators.

The electronic device 1000 may further include the internal module 1160 and the external module 1170. The internal module 1160 may include the sensor module 1161, the antenna module 1162, and the sound output module 1163. The external module 1170 may include the camera module 1171, a light module 1172, and the communication module 1173.

The sensor module 1161 may sense an input caused by a body of the user or an input caused by a pen in the first input module 1131, and generate an electrical signal or a data value, which corresponds to the input. The sensor module 1161 may include at least one of the fingerprint sensor 1161-1, the input sensor 1161-2, and a digitizer 1161-3.

The fingerprint sensor 1161-1 may generate a data value corresponding to a fingerprint of the user. The fingerprint sensor 1161 may include the photo sensors PHS shown in FIG. 1.

The input sensor 1161-2 may generate a data value corresponding to coordinate information of the input caused by the body of the user or the input caused by the pen. The input sensor 1161-2 may generate, as a data value, a capacitance variation caused by the input. The input sensor 1161-2 may sense an input caused by a passive pen, or transmit/receive data to/from an active pen. The input sensor 1161-2 may include the sensors SC shown in FIG. 1.

The input sensor 1161-2 may measure a biometric signal such as pressure, moisture or body fat. For example, when the user does not move for a constant time while a body part of the user is in contact with a sensor layer or a sensing panel, the input sensor 1161-2 may output information which the user wants to the display module 1140 by sensing a biometric signal, based on a change in electric field, caused by the body part.

The digitizer 1161-3 may generate a data value corresponding to the coordinate information of the input caused by the pen. The digitizer 1161-3 may generate, as a data value, an electromagnetic variation caused by the input. The digitizer 1161-3 may sense an input caused by the passive pend, or transmit/receive data to/from the active pen.

At least one of the fingerprint sensor 1161-1, the input sensor 1161-2, and the digitizer 1161-3 may be implemented as a sensor layer formed on the display panel 1141 through a continuous process. At least one of the fingerprint sensor 1161-1, the input sensor 1161-2, and the digitizer 1161-3 may be disposed at an upper side of the display panel 1141, and any one, e.g., the digitizer 1161-3 among the fingerprint sensor 1161-1, the input sensor 1161-2, and the digitizer 1161-3 may be disposed at a lower side of the display panel 1141.

At least two of the fingerprint sensor 1161-1, the input sensor 1161-2, and the digitizer 1161-3 may be formed to be integrated into one sensing panel through the same process. When at least two of the fingerprint sensor 1161-1, the input sensor 1161-2, and the digitizer 1161-3 are integrated into one sensing panel, the sensing panel may be disposed between the display panel 1141 and the window disposed at an upper side of the display panel 1141. In accordance with an embodiment, the sensing panel may be disposed on the window, but the position of the sensing panel is not particularly limited.

At least one of fingerprint sensor 1161-1, the input sensor 1161-2, and the digitizer 1161-3 may be built in the display panel 1141. That is, at least one of fingerprint sensor 1161-1, the input sensor 1161-2, and the digitizer 1161-3 may be simultaneously formed through a process of forming elements (e.g., a light emitting element, a transistor, and the like) included in the display panel 1141.

Besides, the sensor module 1161 may generate an electrical signal or a data value, which corresponds to an internal state or an external state of the electronic device 1000. The sensor module 1161 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas for transmitting a signal or power to the outside or receiving a signal or power from the outside. In accordance with an embodiment, the communication module 1173 may transmit a signal to the external electronic device or receive a signal from the external electronic device through an antenna suitable for a communication scheme. An antenna pattern of the antenna module 1162 may be integrated in one component (e.g., the display panel 1141) of the display module 1140, the input sensor 1161-2, or the like.

The sound output module 1163 is a device for outputting a sound signal to the outside of the electronic device 1000, and include, for example, a speaker used for a general purpose such as multimedia playback or transcription playback and a receiver used for only call reception. In accordance with an embodiment, the receiver may be integrally formed with the speaker or be formed separately from the speaker. A sound output pattern of the sound output module 1163 may be integrated in the display module 1140.

The camera module 1171 may photograph a still image and a moving image. In accordance with an embodiment, the camera module 1171 may include one or more lenses, an image sensor, or an image signal processor. The camera module 1171 may further include an infrared camera capable of measuring existence of the user, a position of the user, eyes of the user, or the like.

The light module 1172 may provide light. The light module 1172 may include a light emitting diode or a xenon lamp. The light module 1172 may operate in linkage with the camera module 1171 or operate independently from the camera module 1171.

The communication module 1173 may establish a wired or wireless communication channel between the electronic device 1000 and the external electronic device 2000, and support communication performance through the established communication channel. The communication module may include any one or all of a wireless communication module such as a cellular communication module, a short-range wireless communication module, or a global navigation satellite system (GNSS) communication module, and a wired communication module such as a local area network (LAN) communication module or a power line communication (PLC) module. The communication module 1173 may communicate with the external electronic device 2000 through a short-range communication network such as Bluetooth™, wireless-fidelity (WiFi) direct, or infrared data association (IrDA), or a long-range communication network such as a cellular network, Internet, or a computer network (e.g., LAN or wide area network (WAN)). The above-described several kinds of communication modules may be implemented into one chip or be respectively implemented as separate chips.

The input module 1130, the sensor module 1161 and the camera module 1171 may be used to control an operation of the display module 1140 in linkage with the processor 1110.

The processor 1110 may output a command or data to the display module 1140, the sound output module 1163, the camera module 1171, or the light module 1172, based on input data received from the input module 1130. For example, the processor 1110 may generate image data, corresponding to input data applied through a mouse, an active pen, or the like, and output the image data to the display module 1140. Alternatively, the processor 1110 may generate command data, corresponding to the input data, and output the command data to the camera module 1171 or the light module 1172. When no input data is received from the input module 1130, the processor 1110 may change the operation mode of the electronic device 1000 to a low power mode or a sleep mode, thereby reducing power consumed in the electronic device 1000.

The processor 1110 may output a command or data to the display module 1140, the sound output module 1163, the camera module 1171, or the light module 1172, based on sensing data received from the sensor module 1161. For example, the processor 1110 may compare authentication data applied by the fingerprint sensor 1161-1 with authentication data stored in the memory 1120 to generate a comparison result, and then execute an application according to the comparison result. The processor 1110 may execute a command or output corresponding image data to the display module 1140, based on sensing data sensed by the input sensor 1161-2 or the digitizer 1161-3. When a temperature sensor is included in the sensor module 1161, the processor 1110 may receive temperature data about a temperature measured from the sensor module 1161, and further perform luminance correction on image data, based on the temperature data.

The processor 1110 may receive measurement data about existence of the user, a position of the user or eyes of the user from the camera module 1171. The processor 1110 may further perform luminance correction on image data, based on the measurement data. For example, the process 1110 which determines presence or existence of the user through an input from the camera module 1171 may output image data of which luminance is corrected to the display module 1140 through the data conversion circuit 1112-2 or the gamma correction circuit 1112-3.

At least some of the above-described components may be connected to each other and communicate signals (e.g., commands or data) therebetween through an inter-peripheral communication scheme, e.g., a bus, a general purpose input/output (GPIO), a serial peripheral interface (SPI), a mobile industry processor interface (MIPI), or an ultra path interconnect (UPI) link. The processor 1110 may communicate with the display module 1140 through an appointed interface, and use any one of the above-described communication schemes. However, the present disclosure is not limited to the above-described communication schemes.

In the display device and the method of driving the same, and the electronic device including the display device in accordance with the present disclosure, a voltage supplied to photo sensors may be changed based on temperature, and accordingly, a temperature characteristic of a light receiving element included in each of the photo sensors can be compensated.

Example embodiments have been disclosed herein, and although specific terms are employed, they are used and are to be interpreted in a generic and descriptive sense only and not for purpose of limitation. In some instances, as would be apparent to one of ordinary skill in the art at the time of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:
   a display panel comprising pixels each including a light emitting element located between a first power line receiving a first power voltage and a second power line receiving a second power voltage, and photo sensors each including a light receiving element located between a third power line receiving a reset voltage and the second power line;
   at least one temperature sensor configured to sense a temperature of the display panel;
   a power supply configured to supply the first power voltage, the second power voltage, and the reset voltage; and
   a controller connected to the temperature sensor and the power supply, wherein the controller controls the power supply such that a voltage value of the reset voltage is changed based on the temperature of the display panel.

2. The display device of claim 1, wherein the power supply changes the reset voltage such that a voltage difference between the reset voltage and the second power voltage is decreased when the temperature of the display panel increases.

3. The display device of claim 2, wherein the power supply increases a voltage value of the second power voltage when the temperature of the display panel increases.

4. The display device of claim 1, wherein the power supply changes the reset voltage such that a voltage difference between the reset voltage and the second power voltage is increased when the temperature of the display panel decreases.

5. The display device of claim 4, wherein the power supply decreases a voltage value of the second power voltage when the temperature of the display panel decreases.

6. The display device of claim 1, wherein the controller further includes a storage device configured to store a lookup table including voltage values of the second power voltage and voltage values of the reset voltage, which correspond to a plurality of temperature values.

7. The display device of claim 1, wherein each of the photo sensors includes:
   a second transistor connected between the first power line and a first node, the second transistor including a gate electrode connected to a reset control line; the light receiving element connected between the first node and the second power line;
   a first transistor including a first electrode connected to a fourth power line receiving a common voltage and a gate electrode connected to the first node; and
   a third transistor connected between a second electrode of the first transistor and a readout line, the third transistor including a gate electrode connected to a sensing scan line.

8. The display device of claim 7, further comprising:
   a reset circuit configured to generate a reset signal supplied to the reset control line, using a gate-on voltage supplied from the power supply;
   a sensing scan driver configured to supply a sensing scan signal to the sensing scan line; and
   a readout circuit configured to receive a sensing signal from the readout line.

9. The display device of claim 8, wherein the controller controls the power supply such that a voltage value of the gate-on voltage is changed based on the temperature of the display panel.

10. The display device of claim 9, wherein the power supply decreases the voltage value of the gate-on voltage when the temperature of the display panel increases, and increases the voltage value of the gate-on voltage when the temperature of the display panel decreases.

11. The display device of claim 10, wherein the controller further includes a storage device configured to store a lookup table including voltage values of the second power voltage, voltage values of the reset voltage, and voltage values of the gate-on voltage, which correspond to a plurality of temperature values.

12. The display device of claim 8, wherein the display panel is divided into at least two blocks, and the photo sensors located in the blocks different from each other are connected to different reset control lines.

13. The display device of claim 12,
   wherein the photo sensors included in a first block among the at least two blocks are connected to a first reset control line, and photo sensors included in a second block different from the first block among the at least two blocks are connected to a second reset control line, and
   wherein the first reset control line is supplied with a first reset signal from a first reset circuit, and the second reset control line is supplied with a second reset signal from a second reset circuit.

14. The display device of claim 13, wherein the power supply supplies a first gate-on voltage to the first reset circuit based on a temperature of the first block, and supplies a second gate-on voltage to the second reset circuit based on a temperature of the second block.

15. An electronic device comprising:
   a display panel including pixels and photo sensors;
   a voltage generating circuit configured to supply a first power voltage and a second power voltage to the pixels, and supply a reset voltage and the second power voltage to the photo sensors;
   a temperature sensor configured to sense a temperature of the display panel; and
   a controller configured to control the voltage generating circuit based on the temperature of the display panel, which is sensed by the temperature sensor,
   wherein the controller controls the voltage generating circuit such that voltage values of the reset voltage and the second power voltage are changed based on the temperature of the display panel.

16. A method of driving a display device including photo sensors each having a light receiving element located between a first power line receiving a reset voltage and a second power line receiving a second power voltage, the method comprising:
   sensing a temperature of a display panel including the photo sensors; and
   changing voltage values of the reset voltage and the second power voltage, which are supplied to the photo sensors, based on the temperature of the display panel.

17. The method of claim 16, wherein, in the changing of the voltage values of the reset voltage and the second power voltage, the reset voltage and the second power voltage are configured to:

be controlled such that a voltage difference between the reset voltage and the second power voltage is decreased when the temperature of the display panel increases; and be controlled such that the voltage difference between the reset voltage and the second power voltage is increased when the temperature of the display panel decreases.

18. The method of claim 16, wherein each of the photo sensors includes an N-type transistor connected between the first power line and the light receiving element, the N-type transistor being turned on by a reset signal, and wherein a voltage value of the reset signal is changed based on the temperature of the display panel.

19. The method of claim 18, wherein a voltage value of a gate-on voltage of the reset signal is decreased when the temperature of the display panel increases, and is increased when the temperature of the display panel decreases.

20. The method of claim 18, wherein the display panel is divided into a plurality of blocks, and a voltage of a reset signal supplied to each of the plurality of blocks is changed based on the temperature of the display panel.

\* \* \* \* \*